(12) United States Patent
Iwahashi et al.

(10) Patent No.: US 7,139,531 B2
(45) Date of Patent: Nov. 21, 2006

(54) OUTDOOR RADIO EQUIPMENT

(75) Inventors: Yasuo Iwahashi, Ohsato (JP); Yuuichi Hagiwara, Ohsato (JP); Tadamitsu Araki, Ohsato (JP); Kouichi Sunaga, Ohsato (JP)

(73) Assignee: Fujitsu Limited, Kawasaki (JP)

( * ) Notice: Subject to any disclaimer, the term of this patent is extended or adjusted under 35 U.S.C. 154(b) by 390 days.

(21) Appl. No.: 10/635,627

(22) Filed: Aug. 6, 2003

(65) Prior Publication Data

US 2004/0185906 A1 Sep. 23, 2004

(30) Foreign Application Priority Data

Sep. 27, 2002 (JP) ............................. 2002-282516

(51) Int. Cl.
*H04B 1/38* (2006.01)

(52) U.S. Cl. .................. 455/73; 455/561; 455/128; 455/562.1

(58) Field of Classification Search ................ 455/561, 455/562.1, 67.11, 73, 90.3, 128, 129, 349; 361/103, 115

See application file for complete search history.

(56) References Cited

U.S. PATENT DOCUMENTS

| | | | | |
|---|---|---|---|---|
| 3,403,395 A | * | 9/1968 | Gundry et al. ............. | 455/90.2 |
| 3,567,353 A | * | 3/1971 | Eisler ......................... | 455/3.02 |
| 5,146,615 A | * | 9/1992 | Hodsdon et al. ........... | 455/90.3 |
| 5,444,868 A | * | 8/1995 | Reynolds et al. ........... | 455/128 |
| 5,548,643 A | | 8/1996 | Dalgeish et al. | |
| 5,754,949 A | | 5/1998 | Kumagai et al. | |
| 5,904,047 A | * | 5/1999 | An ............................... | 62/81 |
| 5,934,079 A | | 8/1999 | Han et al. | |
| 5,982,619 A | | 11/1999 | Giannatto et al. | |
| 5,987,060 A | | 11/1999 | Grenon et al. | |
| 6,128,193 A | * | 10/2000 | Moss et al. .................. | 455/349 |
| 6,320,734 B1 | * | 11/2001 | Sonobe et al. .............. | 361/103 |
| 6,556,811 B1 | * | 4/2003 | Sayers et al. ............... | 455/561 |
| 6,628,925 B1 | * | 9/2003 | Ishida et al. ................. | 455/73 |
| 6,735,450 B1 | * | 5/2004 | Remmert .................... | 455/3.02 |
| 2002/0065052 A1 | * | 5/2002 | Pande et al. ................ | 455/67.5 |
| 2002/0081986 A1 | | 6/2002 | Yokoyama | |
| 2002/0086655 A1 | * | 7/2002 | Ammar et al. ............ | 455/562.1 |
| 2002/0111161 A1 | | 8/2002 | Bourlas et al. | |
| 2002/0119797 A1 | | 8/2002 | Woodhead et al. | |
| 2004/0087279 A1 | * | 5/2004 | Muschallik et al. ........... | 455/73 |

FOREIGN PATENT DOCUMENTS

| | | |
|---|---|---|
| EP | 0 680 156 | 11/1995 |
| EP | 0 863 696 | 9/1998 |
| GB | 2 289 827 | 11/1995 |
| JP | 04-170095 | 6/1992 |
| JP | 2001-24348 | 1/2001 |
| WO | 99/18763 | 4/1999 |
| WO | 01/15507 | 3/2001 |

\* cited by examiner

*Primary Examiner*—Lana Le
(74) *Attorney, Agent, or Firm*—Katten Muchin Rosenman LLP

(57) ABSTRACT

Outdoor radio equipment includes a radio transmitting and receiving part for performing a modulation and demodulation process, and a common part for controlling an action of the radio transmitting and receiving part. The radio transmitting and receiving part is provided at the common part so as to be exposed to open air.

11 Claims, 18 Drawing Sheets

OUTDOOR RADIO EQUIPMENT

BACKGROUND OF THE INVENTION

1. Field of the Invention

The present invention generally relates to outdoor radio equipment, and more particularly, to an radio equipment in under an outdoor situation wherein electronic equipment such as communications equipment is provided.

2. Description of the Related Art

Recently, electronic radio equipment has been required to have a great capacity, in order to realize communications by which high-volume can be transmitted and received at high speed. Because of this, consumption of electric power by such electronic equipment has been increasing and the amount of heat generated per unit volume has been increasing.

Furthermore, such electronic equipment is frequently provided under outdoor situations such as on the roof of a building. Therefore, it is required for such radio equipment to have the ability to endure in an outdoor environment through such features as waterproofing and having good outdoor workability.

FIG. 1 is an exploded perspective view of related art outdoor radio equipment 1. Referring to FIG. 1, the related art outdoor radio equipment 1 has a substantially box-type configuration. The outdoor radio equipment 1 includes a housing 19. A transmitting and receiving board part 2, a control modulation and demodulation board part 3, a branching filter 4, and the like are provided inside of the housing 19.

The housing 19 provides a waterproofing to the above-mentioned electronic equipment provided inside thereof. Furthermore, a sunshade cover 5 is provided at an upper part of the housing 19 so as to shield the housing from sunlight.

A door part 6 is provided at a front surface of the housing 19 and a back surface part 8 is provided at a back surface of the housing 19. The door part 6 is opened for maintenance, providing, for exchange and the like of the above mentioned electronic equipment provided inside of the housing 19.

A great number of radiation heat fins 7 stand in a line at the back surface part 8. The electronic equipment such as the transmitting and receiving board part 2 provided inside the housing part 19 transmits information having a great volume so that electric power consumed and the amount of heat generated are huge.

Because of this, the electronic equipment components such as the transmitting and receiving board part 2 provided for touching the back surface part 8 having the radiation heat fins 7, so as to transfer heat to the radiation heat fins 7. Under the above structure, heat from the electronic equipment such as the transmitting and receiving board part 2 is dissipated.

However, there are problems in a case where the electronic equipment generating a great amount of heat such as the transmitting and receiving board part 2 is provided inside of the above mentioned housing 19 and the housing 19 is provided in an the outdoor environment.

That is, if it is not possible to effectively dissipate the heat generated by the electronic equipment such as the transmitting and receiving board part 2 to the outside of the housing 19 and to cool down the electronic equipment such as the transmitting and receiving board part 2 effectively, the temperature of the electronic equipment provided inside the housing 19 increases. As a result of this, the electronic equipment may malfunction and perform an incorrect action.

As described above, since dissipation of heat with regard to the transmitting and receiving board part 2 and others, which are provided inside the housing 19 and are parts generating high heat, is carried out by only the radiation heat fins 7 provided at the back surface 8, there is a limit to the quantity of heat dissipated. Hence, the related art outdoor radio equipment 1 does not have a sufficient cooling effect of dissipating heat with regard to electronic equipment provided inside thereof.

In addition, if precipitation falls on the housing 19 and moisture adheres to the electronic equipment such as the transmitting and receiving board part 2 provided in the housing 19, the functioning of the electronic equipment is degraded and performing an incorrect action may result.

Although waterproofing the electronic equipment such as the transmitting and receiving board part 2 is attempted by providing the housing 19 and the door part 6 in the related art outdoor radio equipment 1, the waterproofing is not accomplished perfectly. Hence, it is necessary to further improve the waterproofing of the electronic equipment.

In addition, as described above, it is necessary to open and close the door part 6 whenever maintenance, providing for exchange and the like, of the above-mentioned electronic equipment provided inside of the housing 19 is performed.

Therefore, the related art outdoor radio equipment 1 has a problem in terms of workability. Because of this, outdoor radio equipment with improved workability is needed.

SUMMARY OF THE INVENTION

Accordingly, it is a general object of the present invention to provide novel and useful outdoor radio equipment in which one or more of the problems described above are eliminated.

Another and more specific object of the present invention is to provide outdoor radio equipment whereby electronic equipment such as a communications equipment provided in a housing thereof can work without any problem.

The above objects of the present invention are achieved by outdoor radio equipment, including:

a radio transmitting and receiving part for performing a modulation and demodulation process, and a common part for controlling an action of the radio transmitting and receiving part, wherein the radio transmitting and receiving part is provided at the common part so as to be exposed to open air.

The above objects of the present invention are also achieved by a radio unit, the radio unit being installed to a common part which has a function of transmitting and receiving a radio signal via an antenna and a substantially box-type configuration, the radio unit having a modulation and demodulation part for performing a demodulation process of an input radio signal of the common part, outputting the demodulated signal to the common part, performing a modulation process by using another radio signal input from the common part, and outputting a modulated wave to the common part, the radio unit, including:

a second connector part which is engaged with a first connector part of a side surface of the common part when the modulation and demodulation part is installed to the common part and which transmits and receives a signal including the radio signal, an installation part for installing the modulation and demodulation part to the side surface of the common part, and a radiation heat structure for preventing an temperature from increasing in the modulation and demodulation part.

Other objects, features, and advantages of the present invention will become more apparent from the following detailed description when read in conjunction with the accompanying drawings.

DETAILED DESCRIPTION OF THE PREFERED EMBODIMENTS

A description will now be given, with reference to the FIGS. 2–18, of embodiments of the present invention.

Figure 1:
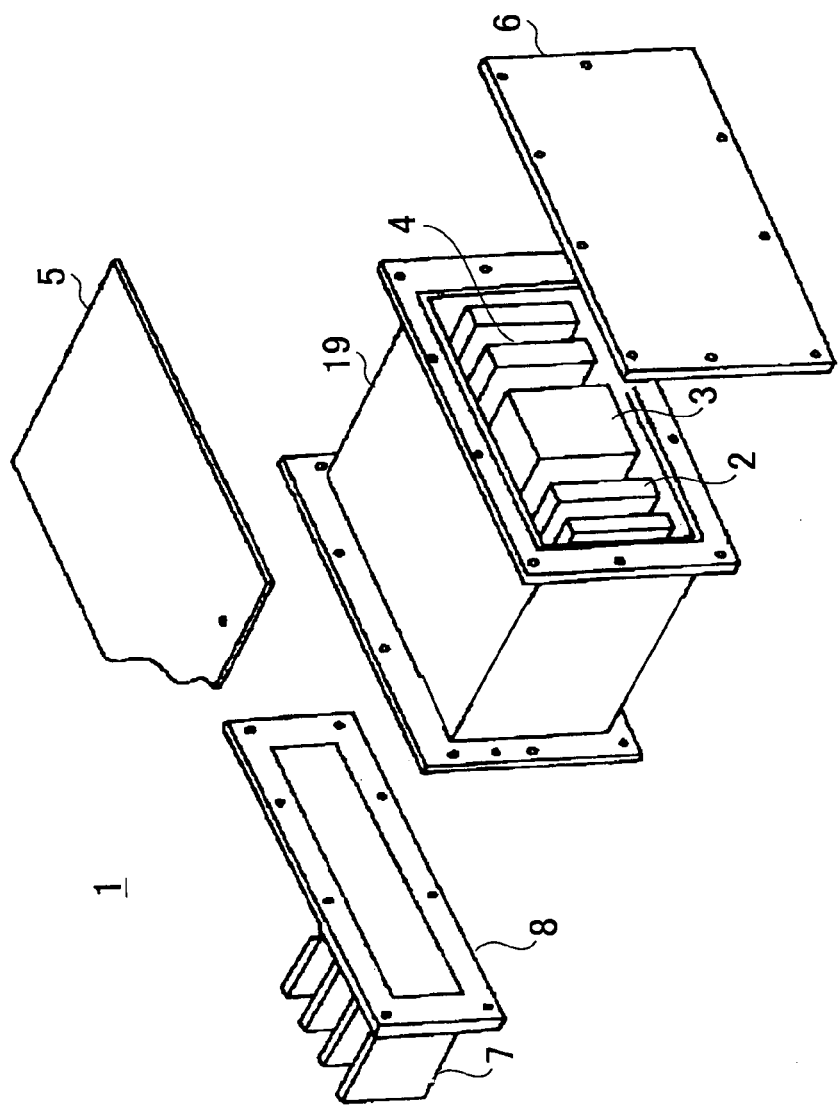
FIG. 1 is an exploded perspective view of the related art outdoor radio equipment 1.
Figure 2:
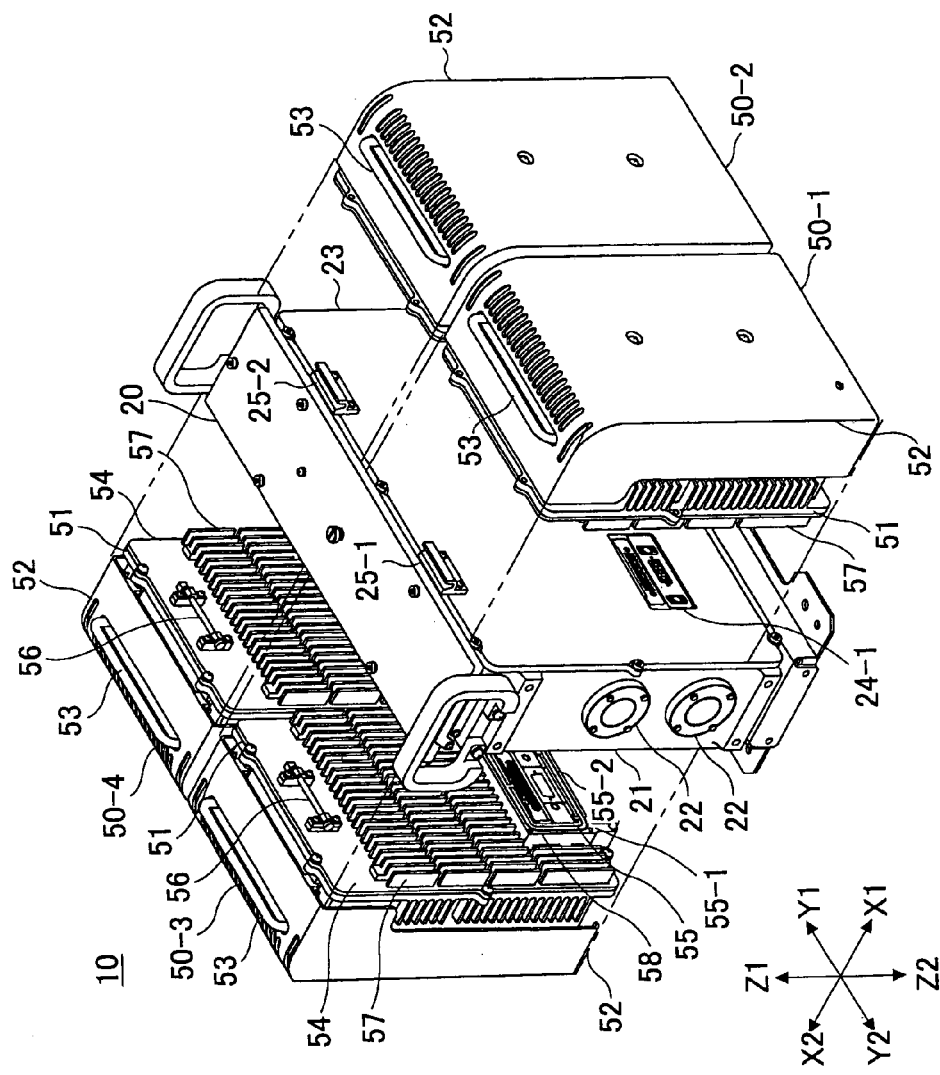
FIG. 2 is an exploded perspective view showing an outside appearance of an outdoor radio equipment 10 of the present invention.

FIG. 2 is an exploded perspective view showing an outside appearance of outdoor radio equipment 10 of the present invention. Referring to FIG. 2, the outdoor radio equipment 10 includes a common part 20, and radio transmitting and receiving parts 50-1, 50-2, 50-3, and 50-4.

The common part 20 has a substantially rectangular parallelepiped (box-type) configuration. The radio transmitting and receiving parts 50-1 and 50-2 are provided at a right side surface part of the common part 20 and have satchel-type configurations. The radio transmitting and receiving parts 50-3 and 50-4 are provided at a left side surface part of the common part 20 and have satchel type configurations.

Figure 3:
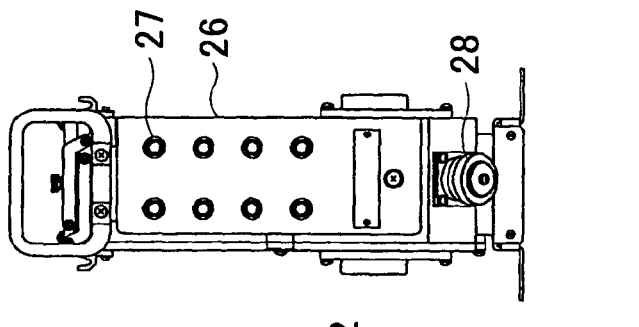
FIG. 3 is a view showing an outside appearance of a common part 20.
Figure 3:
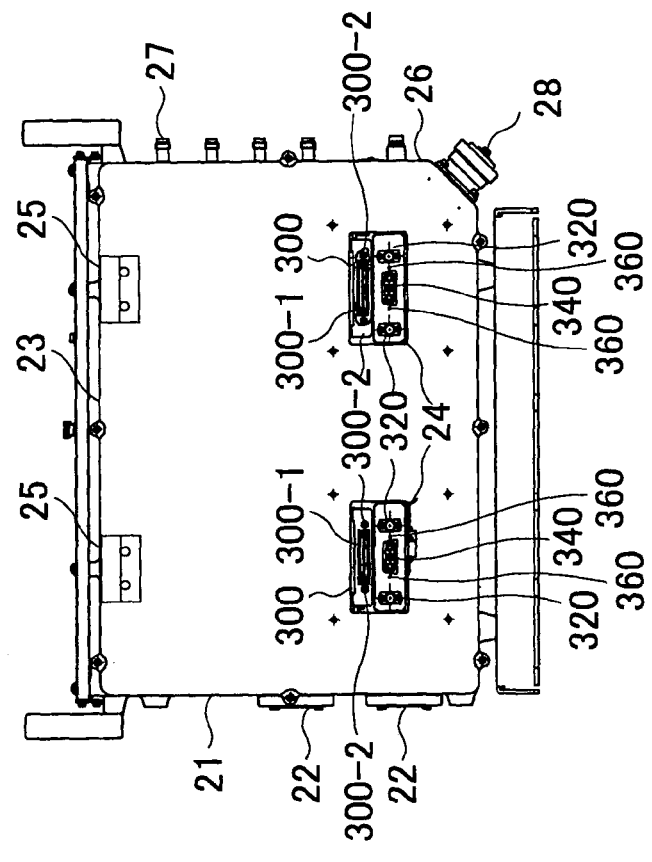
Figure 3:
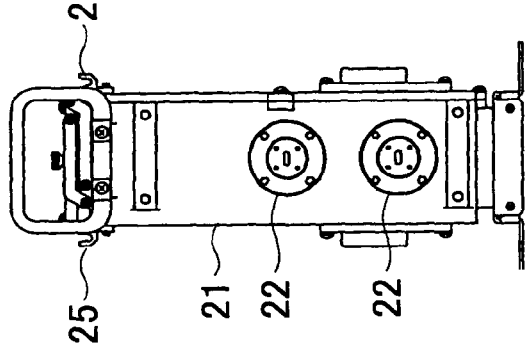

FIG. 3 is a view showing the outside appearance of the common part 20. FIG. 3-(a) is a view seen in the Y2-Y1 direction in FIG. 2. FIG. 3-(b) is a view seen in the X1-X2 direction in FIG. 2. FIG. 3-(c) is a view seen in the Y1-Y2 direction in FIG. 2.

As shown in FIG. 3-(a), two of antenna interface parts 22 stand in a line at upper and lower sides of a front surface 21 of the common part 20. One end part of a waveguide (not shown) for transferring microwaves (SHF: Super High Frequency) and the like whose the end part is connected an antenna is connected to the antenna interface part 22.

Furthermore, as shown in FIG. 3-(b), interface parts 24 for transmitting and receiving part stand in a line at right and left sides of a lower part of a right side surface part 23 of the common part 20. The interface part 24 is provided, as a first interface part, for transmitting and receiving a radio signal and the like. Two of the interface parts 24 are provided at a side surface part situated at the left side of the common part 20 (a surface of the common part 20 seen in the X1 direction in FIG. 2), as well as at the right side surface part 23.

As described below, when the radio transmitting and receiving parts 50-1 through 50-4 are provided at the common part 20, the interface parts 24 are engaged with interface parts 55 for common parts, namely second interface parts, of the radio transmitting and receiving parts 50-1 through 50-4, so as to function as an interface of the common part 20 and the radio transmitting and receiving parts 50-1 through 50-4.

Meanwhile, although it is possible to install four of the radio transmitting and receiving parts 50-1 through 50-4 at the common part 20 at maximum, it is not necessary to provide all four of the radio transmitting and receiving parts 50-1 through 50-4 to the common part 20.

For example, only two of the radio transmitting and receiving parts 50-1 through 50-4 may be provided there. In this case, the other two of the interface parts 24 that are not engaged with the interface parts 55 because the radio transmitting and receiving parts 50-1 through 50-4 are not provided, are covered with covers for waterproofing.

Next, a structure of the interface part 24 is described. Referring to FIG. 3-(b), the interface part 24 includes a first connector, including a first connector part 300, a second connector part 320, and a third connector part 340.

A first connector engaging part 300-1 is provided at a substantially center part of the first connector 300. Guide pins 300-2 are provided at left and right sides of the first connector engaging part 300-1 so as to extend in the vertical direction of the paper of FIG. 3. Structures of the second connector part 320 and the third connector part 340 are described below.

Furthermore, bearing parts 25 for transmitting and receiving parts stand in a line at left and right sides at the upper side of the right side surface part 23 of the common part 20. In addition, as shown in FIG. 3-(a), bearing parts 25 stand in a line at the left and right sides of a side surface part situated at a left side of the common part 20, namely a surface seen in the X1 direction in FIG. 2 of the common part 20, as well as the right side surface part 23.

A hanging shaft member 56 for the common part of the radio transmitting and receiving parts 50-1 through 50-4 is hung and the radio transmitting and receiving parts 50-1 through 50-4 are rotated. The interface part 24 and the interface part 55 are engaged so that the radio transmitting and receiving parts 50-1 through 50-4 are installed and fixed to the common part 20. A structure of installation of the radio transmitting and receiving parts 50-1 through 50-4 to the common part 20 is described below.

Furthermore, as shown in FIG. 3-(c), eight external connectors 27 are provided at the back surface 26 of the common part 20. External equipment not shown is connected to the external connectors. Two of the external connectors 27 are necessary for each of the radio transmitting and receiving parts 50-1 through 50-4 provided at the common part 20. One of the two is for inputting and the other is for outputting. The external connectors 27 for inputting and outputting are used as a couple. An electric power source supply part 28 is provided at a lower part of the back surface part 26 of the common part 20. The electric power source supplies electric power and a signal.

Figure 4:
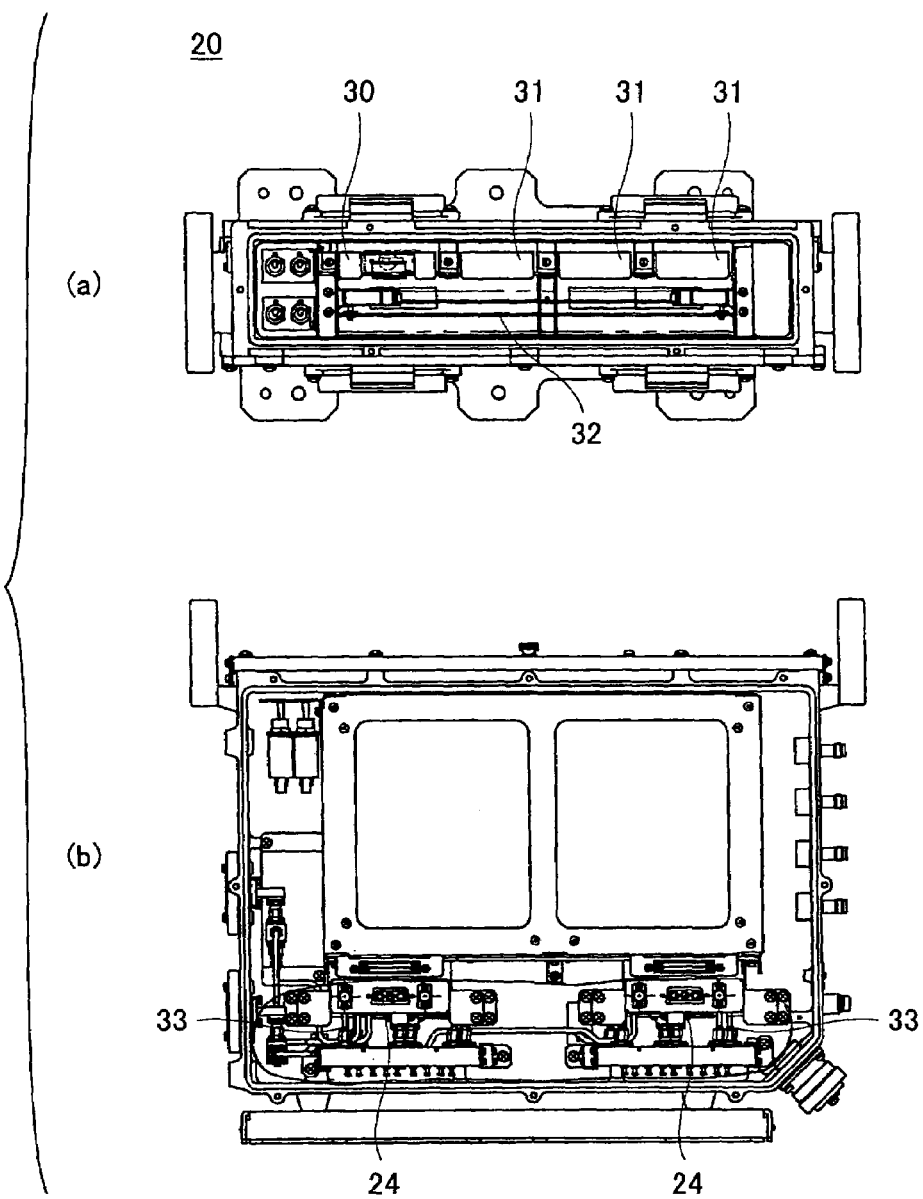
FIG. 4 is a view showing an inside structure of the common part 20.

Next, the inside structure of the common part 20 will be described. FIG. 4 is a view showing the inside structure of the common part 20. FIG. 4-(a) is a cross-sectional view seen in the Z2 direction in FIG. 2. FIG. 4-(b) is a cross-sectional perspective view in the X2 direction in FIG. 2.

Referring to FIG. 4-(a), an electric power source part 30 and a plurality of switching parts 31 are provided parallel to the Y1-Y2 axis in FIG. 2 so as to make a line. Furthermore, a control part 32 is provided offset in the X2 direction in FIG. 2 so as to make a line parallel to the electric power source part 30 and the plurality of switching parts 31.

The electric power source part 30 converts a first electric power source to a second electric power source and supplies electric power to respective electric components provided at the common part 20. The control part 32 monitors the respective radio transmitting and receiving parts 50-1 through 50-4 provided at the common part 20 via the interface part 24. Also, the control part 32 selects a clock signal having a high quality and distributes it to respective radio transmitting and receiving parts 50-1 through 50-4.

In a case where one of the plurality of the radio transmitting and receiving parts 50-1 through 50-4 provided at the common part 20 breaks down, for example, the switching part 31 switches a modulation and demodulation process to another of the radio transmitting and receiving part 50-1 through 50-4.

Referring to FIG. 4-(b), a branching part 33 is provided at the lowest part of the common part 20. When signals having various frequency bands (channels) are input from the antenna., the branching part 33 distributes each signal of each frequency band and sends each of them to one of the radio transmitting and receiving parts 50-1 through 50-4.

Meanwhile, an electric parts package (not shown) provided at the common part 20 is pulled and replaced (exchanged) at an upper side of the common part 20. The branching part 33 is provided at the lowest part of the common part 20 because the branching part 33 is rarely exchanged.

The common part 20 having the above mentioned inside structure supervisorally controls actions of the radio transmitting and receiving parts 50-1 through 50-4, and manages the switching of the respective radio transmitting and receiving parts 50-1 through 50-4 if necessary.

Next, the radio transmitting and receiving parts 50-1 through 50-4 are described. Since the respective radio transmitting and receiving parts 50-1 through 50-4 have same structure and function, only the radio transmitting and receiving part 50-1 is described and explanation of the other radio transmitting and receiving parts 50-2 through 50-4 is omitted.

Figure 5:
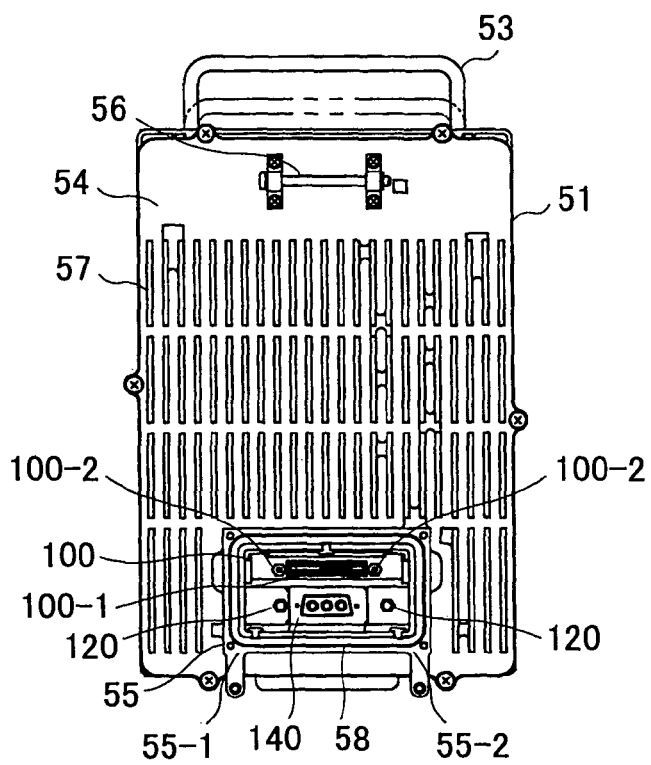
FIG. 5 is a view showing an outside appearance of a ratio transmitting and receiving part 50-1.
Figure 5:
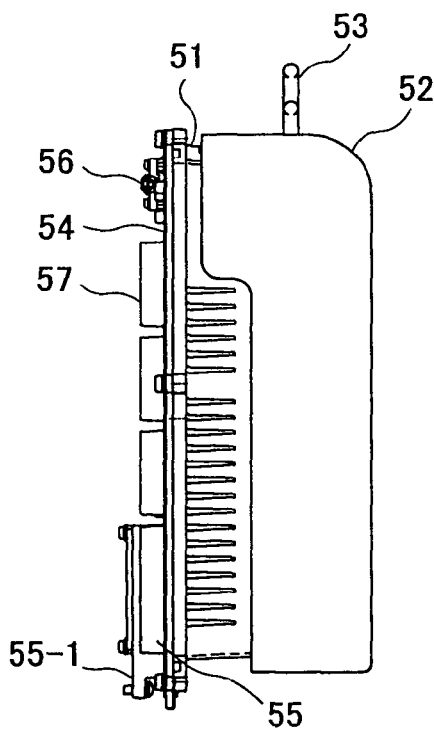

FIG. 5 is a view showing an outside appearance of the ratio transmitting and receiving part 50-1. FIG. 5-(a) is a cross-sectional view seen in the X1 direction in FIG. 2. FIG. 5-(b) is a view seen in the Y1 direction in FIG. 2.

Referring to FIG. 2 and FIG. 5, the radio transmitting and receiving part 50-1 includes a radio transmitting and receiving board part 51 and a sunshade cover 52.

Electronic components installed at the radio transmitting and receiving board part 51 are components generating high heat such as approximately 50 [W]. Therefore, in order to prevent such electronic components from performing an incorrect action, it is required for the radio transmitting and receiving board part 51 to dissipate heat effectively. In the present invention, the radio transmitting and receiving part 50-1, installed in the common part in the related art, is attached at the common part 20 as a separate component. That is, in the present invention, the radio transmitting and receiving part 50-1 is exposed to the open air directly so that the electronic components can radiate heat to the air.

Since the electronic components installed at the common part 20 do not generate as much high heat as the electronic components installed at the radio transmitting and receiving board part 51, a structure wherein only the radio transmitting and receiving parts 50-1 through 50-4 are directly exposed in the air is sufficient.

A great number of radiation heat fins 57 stand lengthwise and crosswise at the back surface part 54 of the radio transmitting and receiving board part 51 as radiation heat members. Heat from a microwave transmitting part 70 and an electric power source 71 (See FIG. 7) provided in the radio transmitting and receiving board part 51 is transmitted to the radiation heat fins 57 so as to be radiated to the outside. A structure of heat generation is described below.

Furthermore, as shown in FIG. 5-(a), the interface part 55 is provided at a substantially center part at a lower side of the back surface member 54 of the radio transmitting and receiving part 50-1. As described above, the radio transmitting and receiving part 50-1 is attached to the common part 20. The interface part 55 is engaged with the interface part 24 of the common part 20. The interface part 55 with the interface part 24 functions as an interface between the common part 20 and the radio transmitting and receiving part 50-1. See FIG. 2.

Meanwhile, the height of the interface part 55 (a height in X2-X1 directions in FIG. 2) is greater than the height of the radiation heat fin 57 (a height in X2-X1 directions in FIG. 2). Therefore, when the radio transmitting and receiving part 50-1 is attached to the common part 20, a gap between the right side surface part 23 of the common part 20 and the back surface member 54 of the radio transmitting and receiving part 50-1 is formed. Because of this, air passes into the gap so that the dissipation of heat by the radiation heat fin 57 can be improved.

Furthermore, surface 55-1, of the interface part 55, made of aluminum or the like is provided as a higher part than the radiation heat fin 57 of the interface part 55. When the interface part 55 of the radio transmitting and receiving part 50-1 is connected to the interface part 24 of the common part 20, the surface 55-1 comes in contact with the interface part 24. A groove forming part 55-2 is formed along with an internal perimeter. A waterproof packing 58 made of silicon group rubber or the like is provided in the groove forming part 55-2 as a waterproof material.

Because of this, when the radio transmitting and receiving part 50-1 is attached to the common part 20 and the interface part 55 is engaged with the interface part 24 of the common part 20, precipitation is prevented from invading the inside of the common part 20 and the radio transmitting and receiving part 50-1 by the waterproof packing 58. That is, because of this structure, transmitting and receiving of electricity and electrical signals are performed between the interface part 24 of the common part 20 and the interface part 55 of the radio transmitting and receiving part 50-1 and waterproofing between the common part 20 and the radio transmitting and receiving part 50-1 is ensured.

The interface part 55 includes a second connector, including a first connector part 100, a second connector part 120, and a third connector part 140 which are situated at a more inside part than the surface 55-1 thereof. The structure thereof is described below.

Furthermore, the hanging shaft member 56 is provided at an upper part of the back surface member 54 of the radio transmitting and receiving board part 51. Attachment of the radio transmitting and receiving part 50-1 to the common part 20 is performed as follows.

First, the hanging shaft member 56 of the radio transmitting and receiving parts 50-1 through 50-4 are hung on bearing parts 25 (See FIG. 3) and the radio transmitting and receiving parts 50-1 through 50-4 are rotated. The interface part 24 and the interface part 55 are engaged so that the radio transmitting and receiving parts 50-1 through 50-4 are installed and fixed to the common part 20.

Referring to FIG. 5-(b), the radio transmitting and receiving part 50-1 is provided so as to be exposed to the air directly and the radio transmitting and receiving board part 51 is covered with the sunshade cover 52. The sunshade cover 52 shields the radio transmitting and receiving board part 51 from sunlight. Furthermore, a handle part 53 is provided at an upper part of the sunshade cover 52 in order that an operator can easily carry the radio transmitting and receiving part 50-1.

Figure 6:
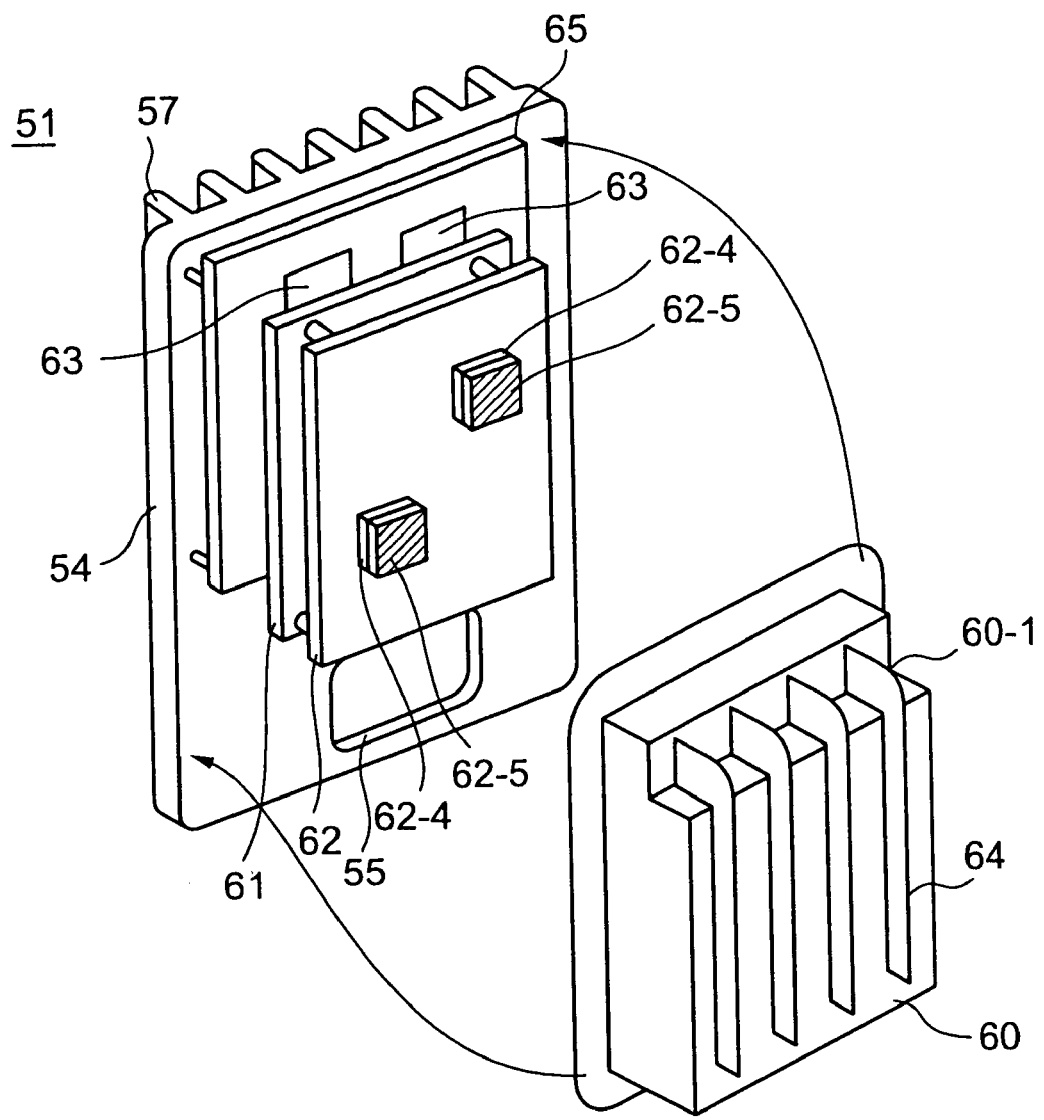
FIG. 6 is an exploded perspective view showing a schematic structure of a radio transmitting and receiving board part 51.
Figure 6:
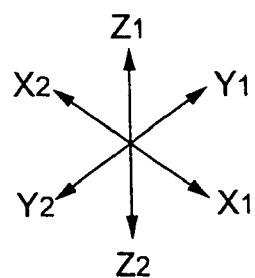

Next, the inside structure of the radio transmitting and receiving board part 51 is described. FIG. 6 is an exploded perspective view showing a schematic structure of the radio transmitting and receiving board part 51.

Referring to FIG. 6, the radio transmitting and receiving board part 51 has a structure wherein a waterproof housing 60 and the back surface member 54 having a great number of the above mentioned radiation heat fins 57 are combined. Only the position at the back surface member 54 of the interface part 55 is shown in FIG. 6 and details of the structure of the interface part 55 are omitted.

An indentation forming part 60-1 is provided in the Y1-Y2 directions at an upper part of a surface in the X-Z plane of the waterproof housing 60. Radiation heat fins 64 extending in the Z2 direction from the indentation part 60-1 are provided at a surface in the Y-Z plane of the waterproof housing 60 so as to form lines parallel in the Y1-Y2 directions.

A first modulation and demodulation part 61, a second modulation and demodulation part 62, and a housing 65 for heat pipes where a plurality of heat pipes 63 are provided in parallel at right and left sides (in Y1-Y2 directions) at an upper surface thereof, are provided at the back surface member 54.

Gas such as freon gas is flowed inside of the heat pipes 63. As described below, the housing 65 for heat pipes covers electronic equipment such as the microwave transmitting part 70, the electric power source 71, and a microwave receiving part 72 provided at the back surface member 54. See FIG. 7.

Thus, electronic equipment components are stacked inside of the respective radio transmitting and receiving board parts 51 of the radio transmitting and receiving parts 50-1 through 50-4. The respective radio transmitting and receiving board parts 51 function as single radio transmitting and receiving apparatuses.

Figure 7:
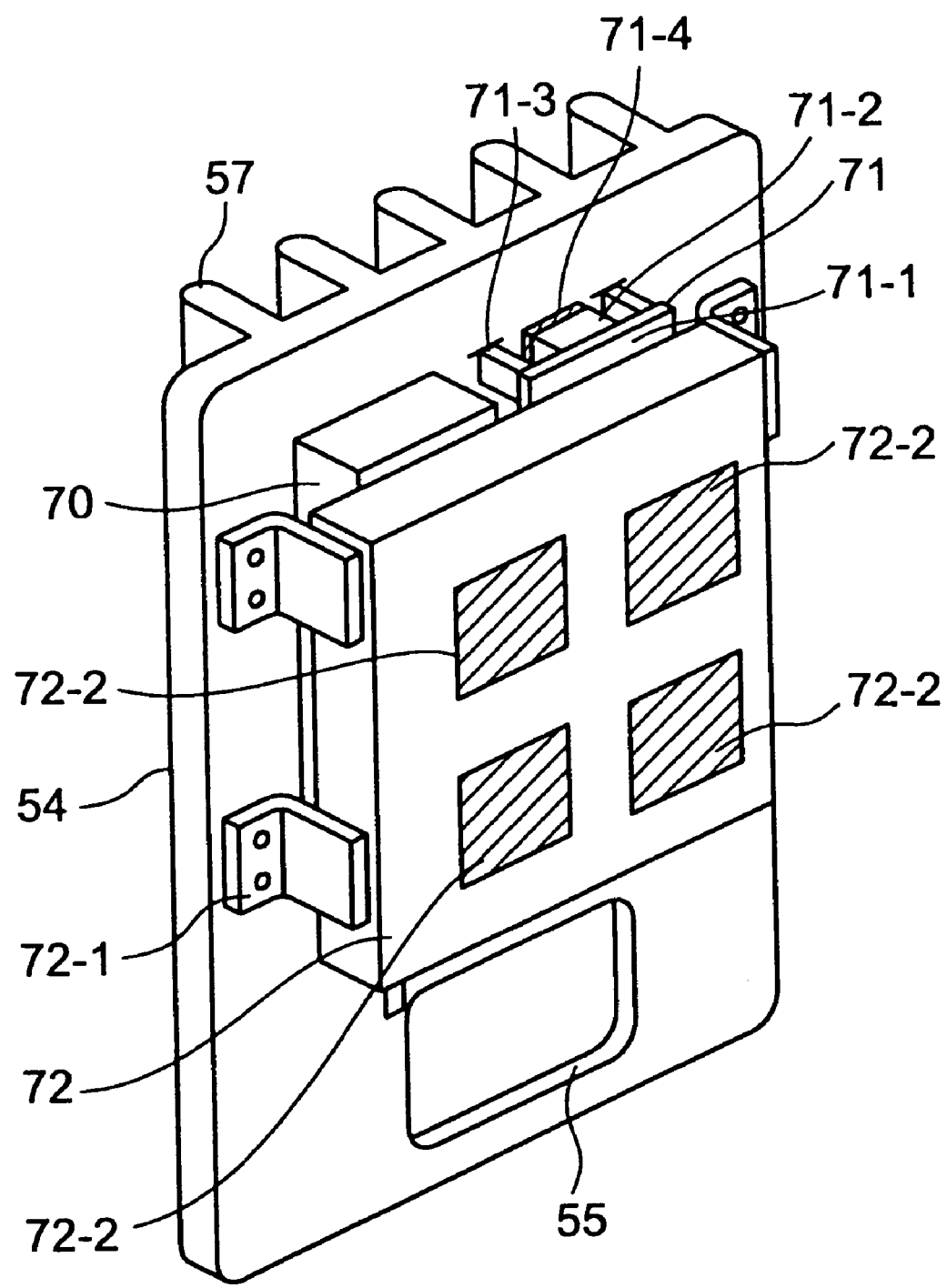
FIG. 7 is a view showing a state where a microwave transmitting part 70, a power source part 71, and a microwave receiving part 72 are provided at a back surface member 54.

Next, an arrangement structure of the electronic equipment provided at the back surface member 54 is described in order of being provided at the back surface member 54. FIG. 7 is a perspective view showing a state, where the microwave transmitting part 70, the power source part 71, and the microwave receiving part 72 are provided at a surface of the back surface member 54, opposite to the surface where the radiation heat fins 57 are provided. Only a position at the back surface member 54 of the interface part 55 is shown in FIG. 7 and details of the structure thereof are omitted.

Referring to FIG. 7, the microwave transmitting part 70 is provided at the left side and the electric power source part 71 is provided at the right side, at the surface of the back surface member 54 opposite to the surface where the radiation heat fins 57 are provided.

Electronic parts having high frequencies are provided inside the micro wave transmitting part 70. The microwave transmitting part 70 includes a housing whose outside part is made of aluminum. The microwave transmitting part 70 directly attaches to the surface opposite to the surface where the radiation heat fins 57 of the back surface member 54 are provided, without forming a space. Therefore, heat from the microwave transmitting part 70 is directly transferred to the radiation heat fins 57 provided at the back surface member 54.

The electric power source part 71 supplies electric power to the radio transmitting and receiving board part 51. The electric power source part 71 includes a printed circuit board 71-1, an electric power source module 71-2, and a support leg part 71-3. The electric power source module 71-2 is provided on the printed circuit board 71-1. The support leg part 71-3 supports the printed circuit board 71-1 at the surface opposite to the surface where the radiation heat fins 57 are provided.

A heat conductive sheet 71-4 is put on the electric power source module 71-2. Hence, the electric power source module 71-2 comes in contact with the surface opposite to the surface where the radiation heat fins 57 are provided, via the heat conductive sheet 71-4. Because of this, heat from the electric power source module 71-2 is transferred to the radiation heat fins 57 provided at the back surface member 54.

The distance between the printed circuit board 71-1 and the surface opposite to the surface where the radiation heat fins 57 are provided of the back surface member 54 may unstable due to a bend of the printed circuit board 71-1 or the like. However, because of the above-mentioned structure, occurrence of the unstable situation can be prevented.

Electronic parts are provided inside the microwave receiving part 72. The microwave receiving part 72 includes a housing whose outside part is made of aluminum. The microwave receiving part 72 covers the above mentioned the microwave transmitting part 70 and the electric power source part 71. Furthermore, the microwave receiving part 72 is connected to the surface opposite to the surface where the radiation heat fins 57 are provided by four metal fittings 72-1. In addition, a heat conductive sheet 72-2 is put on an upper surface of the microwave receiving part 72. Details of the heat conductive sheet 72-2 are described below.

Figure 8:
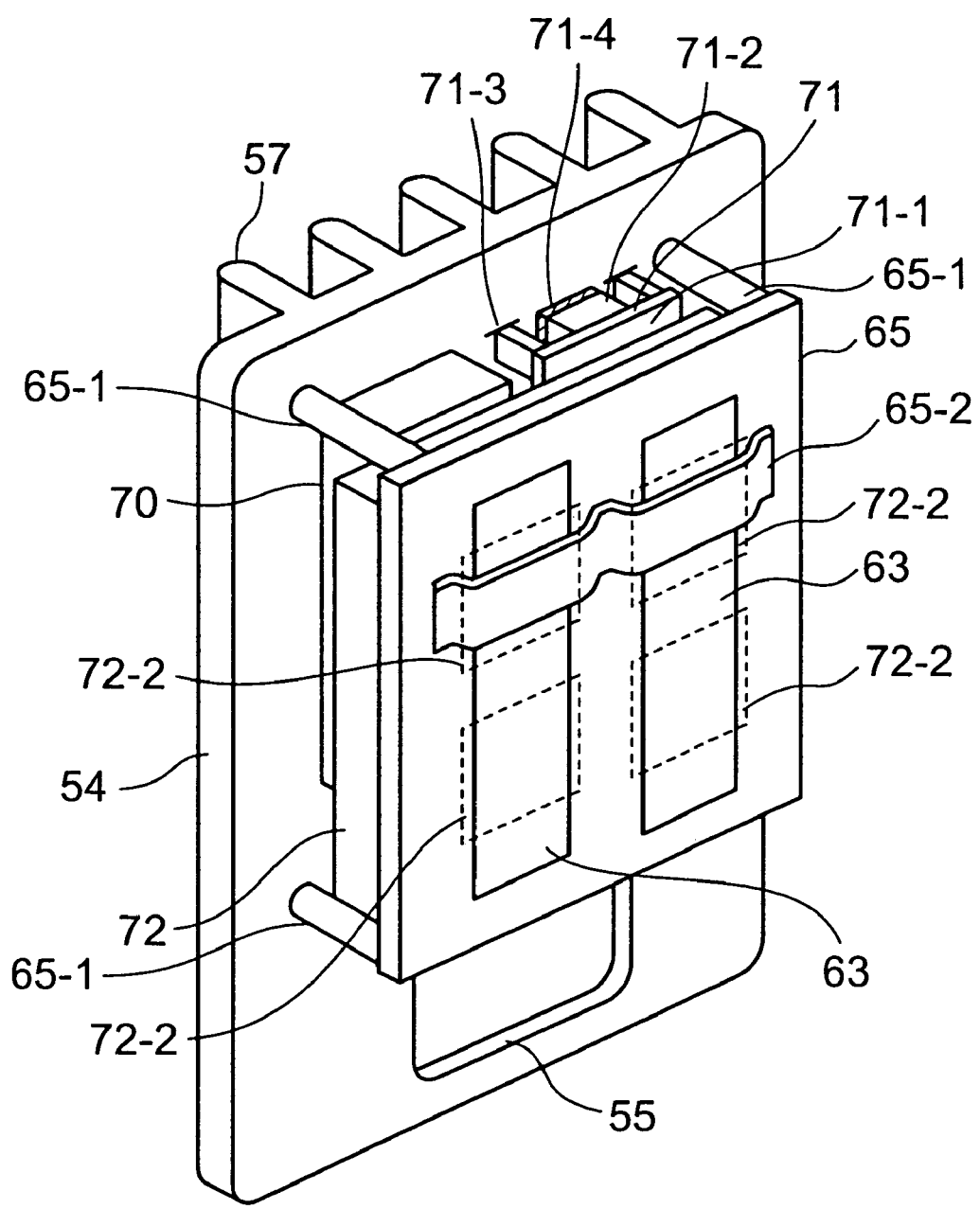
FIG. 8 is a perspective view showing a state where a housing 65 for a heat pipe is further provided at the back surface member 54 in the state shown in FIG. 7.

FIG. 8 is a perspective view showing a state where the housing 65 for heat pipes is further provided at the back surface member 54 in a state shown in FIG. 7. Only a position at the back surface member 54 of the interface part 55 is shown in FIG. 7 and details of a structure thereof are omitted. Furthermore, illustrations of the metal fittings 72-1 shown in FIG. 7 are omitted in FIG. 8 so as to reveal the positional relation of respective electronic equipment components.

Referring to FIG. 8, the housing 65 for heat pipes made of aluminum is provided on the microwave receiving part 72 (in the X1 direction in FIG. 6). Four support leg parts 65-1 for supporting the housing 65 at the surface opposite to the surface where the radiation heat fins 57 are provided at vicinities of the four corners of the housing 65. In addition, heat pipes 63 are provided in parallel right and left (in Y1-Y2 directions in FIG. 6) at an upper surface of the housing 65 and supported by a heat pipe supporting part 65-2.

Meanwhile, the above mentioned heat conductive sheets 72-2 shown by dotted lines in FIG. 8 come in contact with the housing 65 for heat pipes. Therefore, heat from the microwave receiving part 72 is transferred to the heat pipes provided at the upper surface of the housing 65, via the heat conductive sheet 72-2 and the housing 65.

Figure 9:
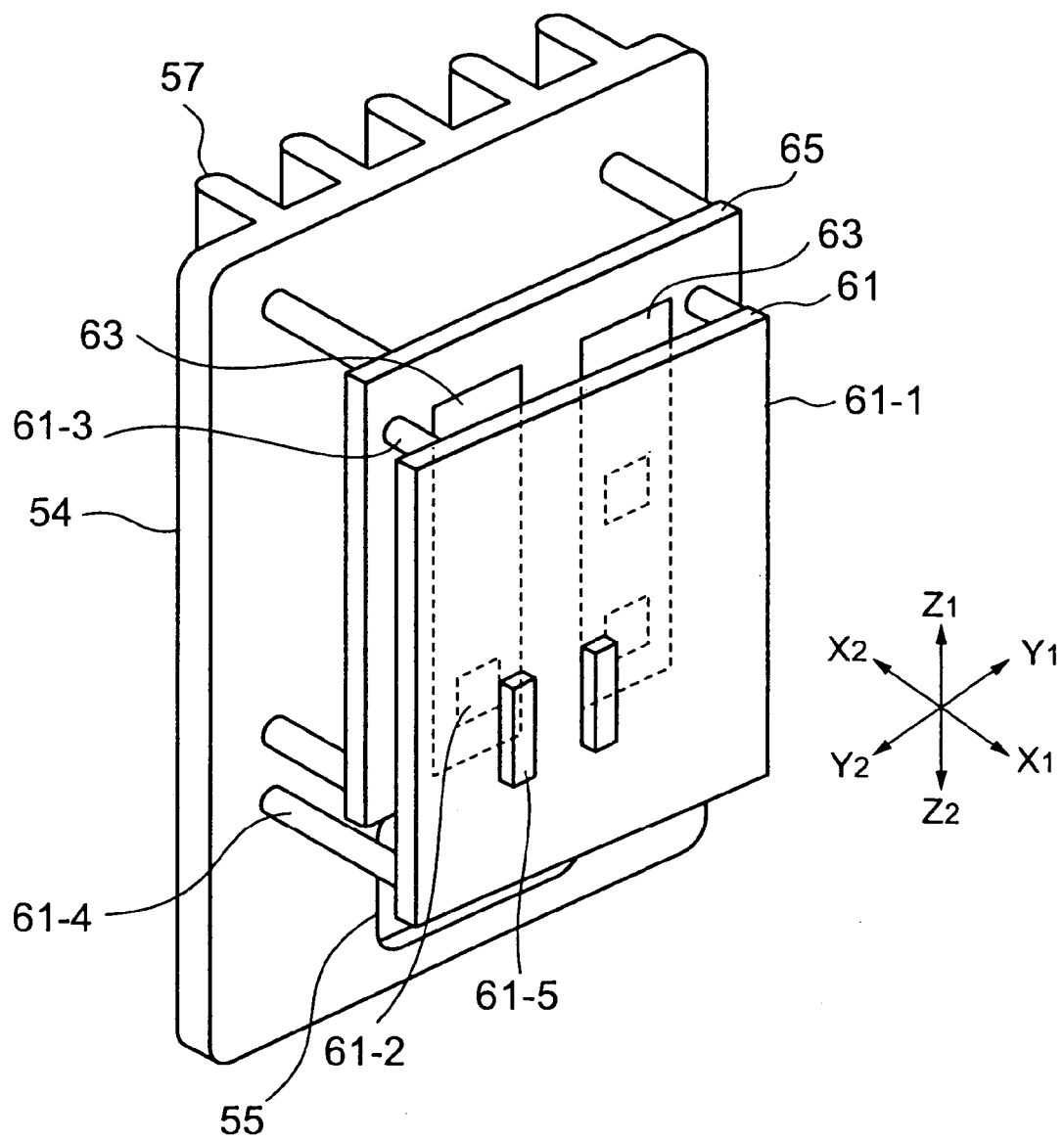
FIG. 9 is a perspective view showing a state where a first modulation and demodulation part 61 is further provided in the housing 65 for a heat pipe in the state shown in FIG. 8.

FIG. 9 is a perspective view showing a state where the first modulation and demodulation part 61 is further provided on the housing 65 in a state shown in FIG. 8. Illustrations of the microwave transmitting part 70, the electric power source part 71, the microwave receiving part 72, and the heat pipe support part 65-2 are omitted for convenience of explanation of FIG. 9.

Referring to FIG. 9, the first modulation and demodulation part 61 is provided on the above mentioned housing 65 (in the X1 direction in FIG. 6). Two support leg parts 61-3 for supporting the first modulation and demodulation part 61 at an upper surface of the housing 65 for heat pipes are provided at vicinities of two corners at the upper side of the first modulation and demodulation part 61. Two support leg parts 61-4 are provided for supporting the first modulation and demodulation part 61 at the surface opposite to the surface where the radiation heat fins 57 are provided at vicinities of two corners at the lower side of the first modulation and demodulation part 61.

Furthermore, a connection connector 61-5 for a second modulation and demodulation part 62 (See FIG. 11) is provided at a substantially center part situated at a lower part of the upper surface of the printed circuit board 61-1 of the first modulation and demodulation part 61 so as to be connected to the second modulation and demodulation part 62 described below.

In addition, a heat generation part 61-2 shown by a dotted line in FIG. 9 is provided at a surface of the housing 65 for heat pipes of the printed circuit board 61-1.

Figure 10:
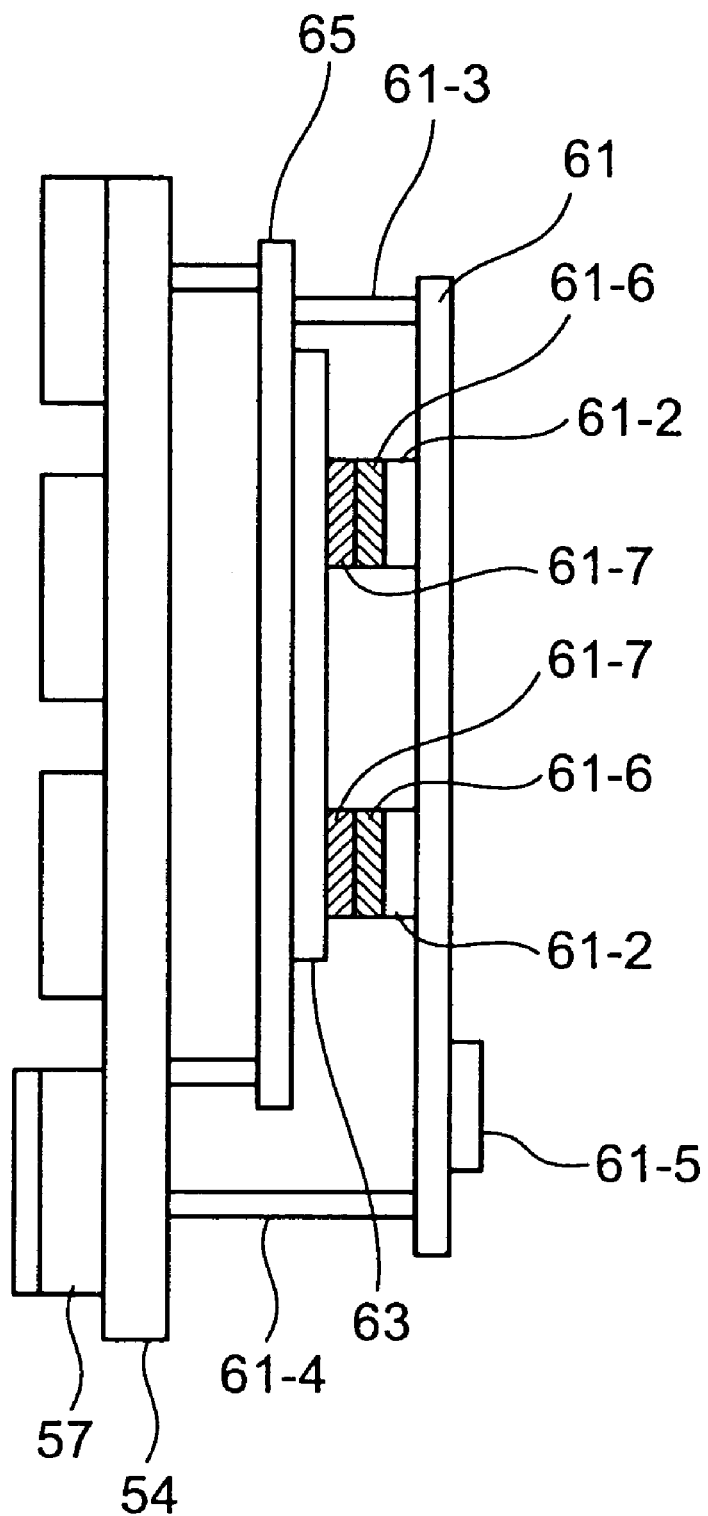
FIG. 10 is a view of the back surface member 54, the housing 65 for a heat pipe, the first modulation and demodulation part 61 and others, as viewed in the Y2-Y1 direction of FIG. 9.

Meanwhile, FIG. 10 is a view of the back surface member 54, the housing 65 for heat pipes, the first modulation and demodulation part 61 and others, seen in the Y1 direction of FIG. 9.

Referring to FIG. 10, a block body 61-6 made of aluminum and a heat conductive sheet 61-7 are provided at each of the respective heat generation parts 61-2. The heat conductive sheet 61-7 comes in contact with the heat pipes 63 provided at the upper surface of the housing 65.

Hence, heat generated by the heat generation parts 61-2 is transferred to the heat pipes 63 via the block bodies 61-6 and the heat conductive sheets 61-7.

The distance between the printed circuit board 61-1 and the heat pipes 63 may be unstable due to a bend of the printed circuit board 61-1 or the like. However, since the block bodies 61-6 and the heat conductive sheets 61-7 are used in this embodiment, occurrence of the unstable situation can be prevented.

Figure 11:
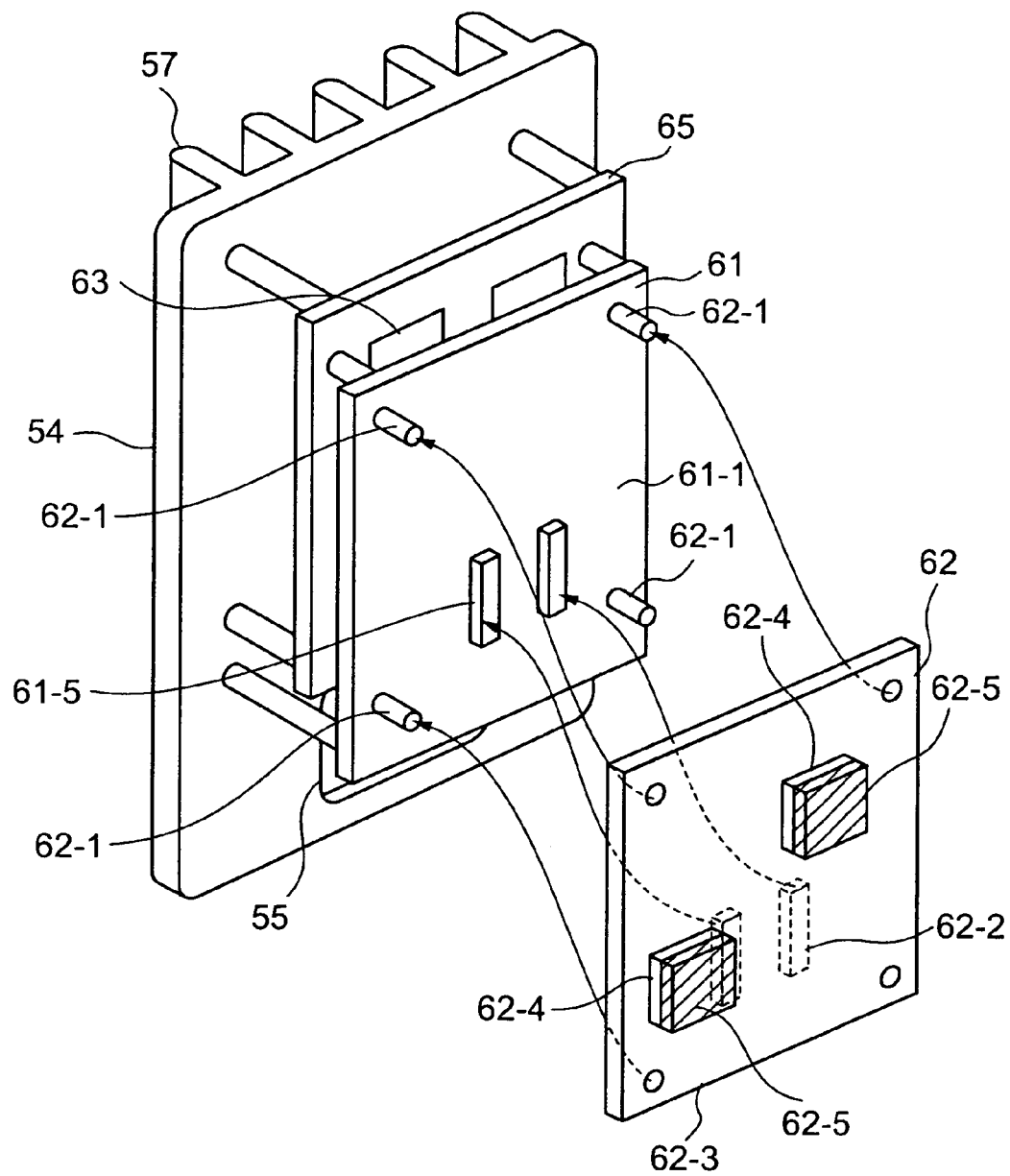
FIG. 11 is a view showing an installation of a second modulate and demodulate part 62 to the first modulate and demodulate part 61 in the state shown in FIG. 9.

FIG. 11 is a view showing an installation of a second modulation and demodulation part 62 to the first modulation and demodulation part 61 in a state shown in FIG. 9;

Referring to FIG. 11, four leg parts 62-1 are provided at vicinities of respective four corners of the printed circuit board 61-1 of the first modulation and demodulation part 61. Via the leg parts 62-1, the second modulation and demodulation part 62 is provided at the printed circuit board 61-1.

Furthermore, a connection connector 62-2 for the first modulation and demodulation part (shown by a dotted line in FIG. 11) is provided at a substantially center part situated at a lower part of a surface at a side of the first modulation and demodulation part 61 of the second modulation and demodulation part 62 so as to be connected to the first modulation and demodulation part 61.

Therefore, when the second modulation and demodulation part 62 is provided at the first modulation and demodulation part 61, the connection connector 62-2 of the second modulation and demodulation part 62 is connected to the connection connector 61-5 of the first modulation and demodulation part 61.

In addition, generation heat parts 62-4 are provided at an upper surface of a printed circuit board 62-3 of the second modulation and demodulation part 62. A heat conductive sheet 62-5 is put on each of the generation heat parts 62-4. As described below, the second modulation and demodulation part 62 is covered with a waterproof housing 60 (See FIG. 6), the generation heat part 62-4 comes in contact with the radiation heat fins 64 of the waterproof housing 60 via the heat conductive sheet 62-5 so that heat is transferred to the radiation heat fins 64.

The distance between the printed circuit board 62-3 and the radiation heat fins 64 may be unstable due to a bend of the printed circuit board 62-3 or the like. However, since the heat conductive sheet 62-5 is used in this embodiment, occurrence of the unstable situation can be prevented.

Figure 12:
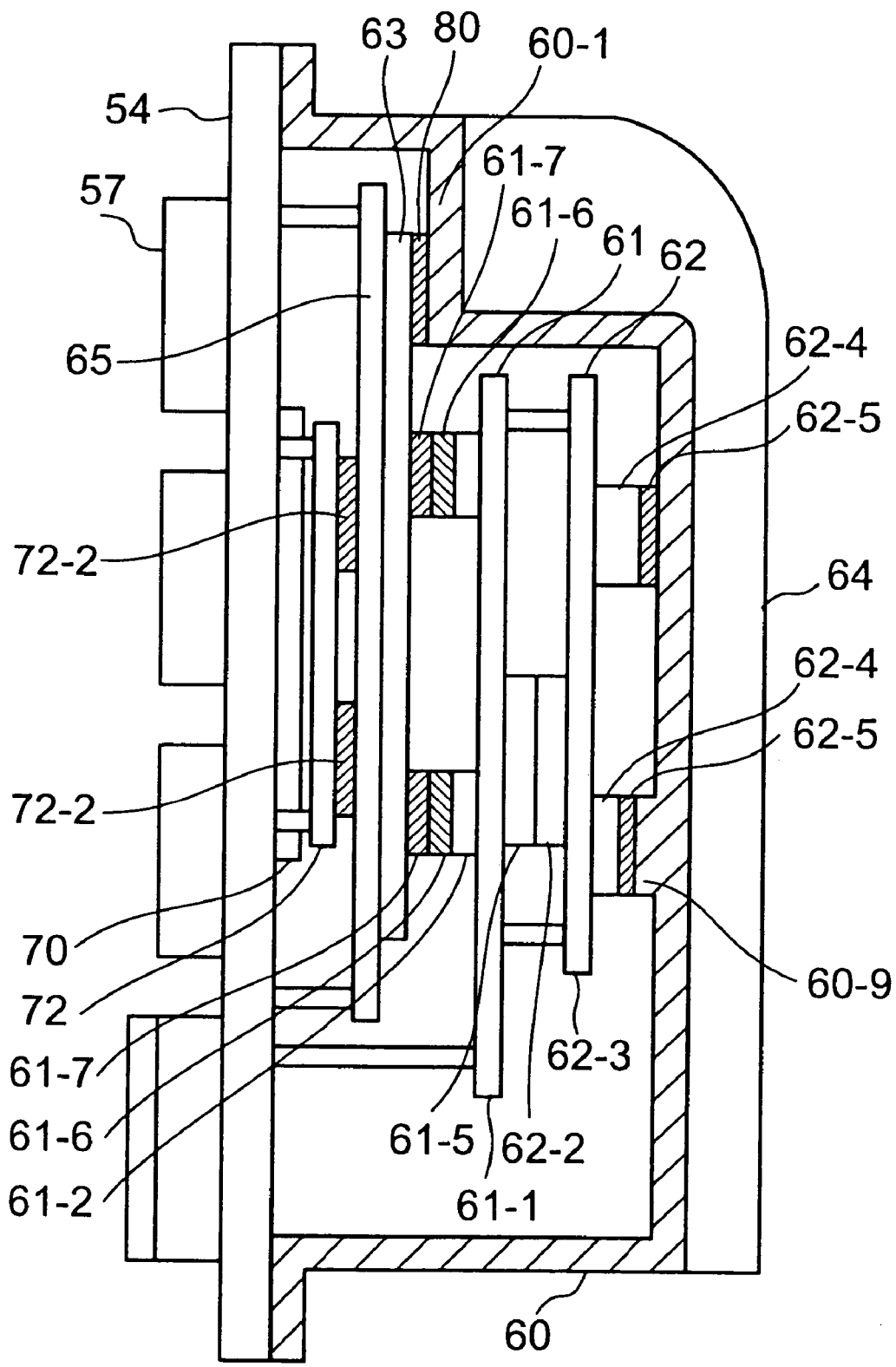
FIG. 12 is a view for explaining a structure of radiation of heat of the radio transmitting and receiving part 51.

Next, the radiation heat structure of the radio transmitting and receiving board part 51 is described. FIG. 12 is a view for explaining a structure of radiation of heat of the radio transmitting and receiving part 51 and a cross-sectional view of the radio transmitting and receiving board part 51 seen in the Y1 direction in FIG. 6.

As described above, the radio transmitting and receiving part 50-1 having the radio transmitting and receiving board part 51 where the electric equipment components having a large amount of electric power consumption are provided is installed to the common part 20, so as to be directly exposed in the air and directly radiate heat to the outside of the outdoor radio equipment 10. More specifically, the radiation heat structure shown in FIG. 12 is provided inside of the radio transmitting and receiving board part 51.

A microwave transmitting part 70 directly adheres to a surface opposite to the surface where the radiation heat fins 57 are provided of the back surface member 54 without forming a gap. Therefore, heat generated from the microwave transmitting part 70 is directly transferred to the radiation heat fins 57 provided at the back surface member 54 so as to be dissipated into the air.

As shown in FIG. 7, the electric power source 71 comes in contact with the surface opposite to the surface where the radiation heat fins 57 are provided of the back surface member 54, via the heat conductive sheet 71-4 put on the electric power source module 71-2 of the electric power source part 71. Because of this, heat generated from the electric power source module 71-2 is directly transferred to the radiation heat fins 57 provided at the back surface member 54 so as to be radiated into the air.

Heat formed in the microwave receiving part 72 is transferred to the heat pipes 63 provided at the upper surface of the housing 65, via the heat conductive sheet 72-2 put on the upper surface of the microwave receiving part 72 and the housing 65 for heat pipe made of aluminum and coming in contacting with the heat conductive sheet 72-2.

Heat from the generation heat parts 61-2 provided on the printed circuit board 61-1 of the first modulation and demodulation part 61 is transmitted to the heat pipes 63 via the block bodies 61-6 on the heat generation parts 61-2 and the heat conductive sheet 61-7.

The heat pipes 63 come in contact with the indentation part 60-1 of the waterproof housing 60 via the radiation heat sheet 80. Therefore, heat transferred to the heat pipes 63 is radiated into the air.

Heat generated from the generation heat parts 62-4 provided on the printed circuit board 62-3 of the second modulation and demodulation part 62 is transmitted to the waterproof housing 60 via the heat conductive sheet 62-5 so as to be radiated into the air. There is a variety of heights (lengths in right and left directions in FIG. 12) of the respective generation heat parts 62-4. Therefore, a convex part 60-9 is provided at the waterproof housing 60 for the generation heat part 62-4 having a low height so as to adjust differences of the respective generation heat parts 62-4 with the heat conductive sheet 62-5. Because of this, a stable distance between the printed circuit board 62-3 and the waterproof housing 60 is achieved.

Meanwhile, the radiation heat fins 64 of the waterproof housing 60 are covered with the sunshade cover 52 as shown in FIG. 5. Only the Z1-Z2 direction in FIG. 6 should be considered as a direction of a flow of air wind contributing to the dissipation of heat. Therefore, the radiation fins 64 are provided at the substantially same intervals in Y1-Y2 directions in FIG. 6 so as to form straight lines without breaks in Z1-Z2 direction.

On the other hand, slits are formed in Y1-Y2 directions at the radiation heat fins 57 of the back surface member 54 as well so as to flow the air contributing to the dissipation of heat and further improve the heat radiation effect.

Although the electronic equipment components are installed inside of the radio transmitting and receiving board part 51 having the above-mentioned structure at a high density, heat from the respective electronic equipment components is radiated into the air efficiently.

Next, the processing and flow of a radio cycle at the microwave receiving part 72, the microwave transmitting part 70, the first modulation and demodulation part 61, and the second modulation and demodulation part 62, are described.

The radio cycle having a frequency of 18 [GHz], for example, input to the common part 20 via the antenna is distributed by the common part 20 so as to be sent to the radio transmitting and receiving part 50-1 via the interface part 24 and the interface part 55.

The radio cycle is converted to a radio cycle having a frequency of 844 [MHz], for example, to a microwave local signal at the microwave receiving part 72.

Next, the radio cycle converted at the microwave receiving part 72 is converted to a radio cycle having a frequency of 70 [MHz], for example, to a local signal at the first modulation and demodulation part 61.

Furthermore, the radio cycle converted at the first modulation and demodulation part 61 is converted to a radio cycle having a frequency of 28 [MHz], for example, to a local signal at the second modulation and demodulation part 62, modulated so as to be a signal of 155 [Mbps] for example, and sent to the common part 20. The signal is switched by the common part 20 and taken into an external equipment component connected to the external part connector 27.

In a case where a radio cycle is received, a process and its flow is opposite to the above mentioned process and flow.

That is, a signal of 155 [Mbps], for example, sent from the external equipment to the common part 20 is switched by the common part 20 so as to be sent to the radio transmitting and receiving part 50-1.

The signal sent to the second modulation and demodulation part 62 of the radio transmitting and receiving part 50-1 is modulated to a radio cycle having a frequency of 28 [MHz], for example.

Furthermore, the radio cycle is converted to a radio cycle having a frequency of 70 [MHz] for example, to the local signal.

The radio cycle converted at the second modulation and demodulation part 62 is converted to a radio cycle having a frequency of 844 [MHz], for example, at the first modulation and demodulation part 61 to the local signal.

Next, the radio cycle converted at the first modulation and demodulation part 61 is converted to a radio cycle having a frequency of 18 [GHz], for example, at the micro wave transmitting part 70 to the microwave local signal, and sent to the common part 20 via the interface part 24 and the interface part 55. The radio cycle sent to the common part 20 is transmitted via the antenna.

Next, an engaging structure of the interface part 24 of the common part 20 and the interface part 55 of the radio transmitting and receiving part 50-1 is described.

Figure 13:
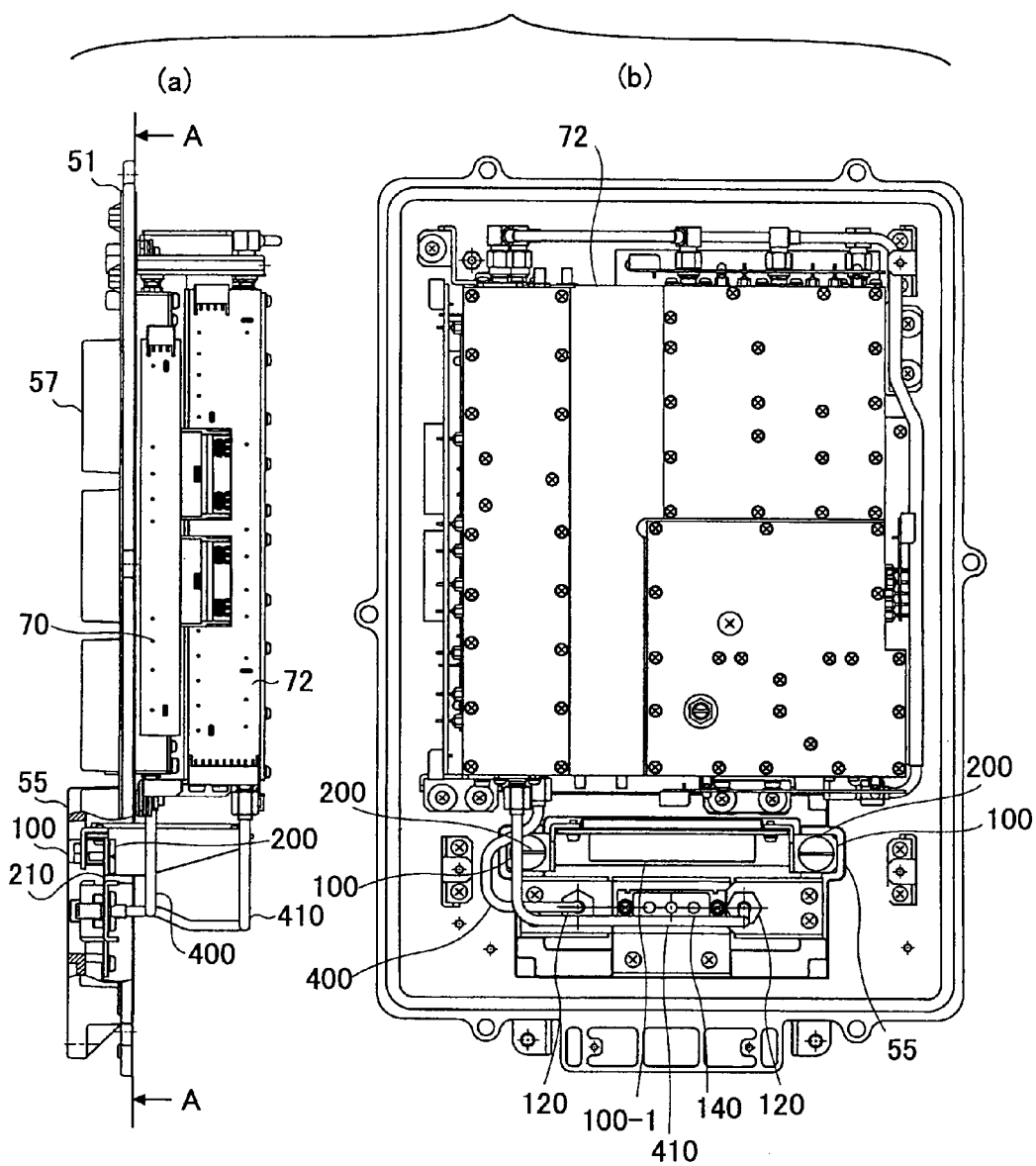
FIG. 13 is a view showing details of a structure of an interface part 55 of the radio transmitting and receiving part 50-1.

FIG. 13 is a view showing details of a structure of the interface part 55 of the radio transmitting and receiving part 50-1. More particularly, FIG. 13-(a) is a view of the radio transmitting and receiving part 50-1 seen in the Y1 direction in FIG. 6 when the sunshade cover 52, the waterproof housing 60, and designated electronic components are removed from the radio transmitting and receiving part 50-1 in a state shown in FIG. 5-(b). In FIG. 13-(a), the inside structure of the interface part 55 of the radio transmitting and receiving part 50-1 is shown in perspective. FIG. 13-(b) is a view of the radio transmitting and receiving part 50-1 of FIG. 13-(a) seen in the "A" direction in FIG. 13-(a).

Referring to FIGS. 5 and 13, the interface part 55 of the radio transmitting and receiving part 50-1 includes the first connector part 100, the second connector part 120, and the third connector part 140.

The first connector part 100 transmits and receives electricity and signals from and to the interface part 24 of the common part 20.

Approximately two hundreds pins are provided at a first connector engaging part 100-1. The first connector engaging part 100-1 is connected to the second modulation and demodulation part 62 via the printed circuit board and a wire not shown. Guide pin receiving hole forming parts 100-2 (See FIG. 14) are provided right and left of the first connector engaging part 100-1.

As shown in FIG. 13-(a) and FIG. 13-(b), both ends of the first connector part 100 are attached to a fixing plate 210 by two screws 200 for fixing.

Figure 14:
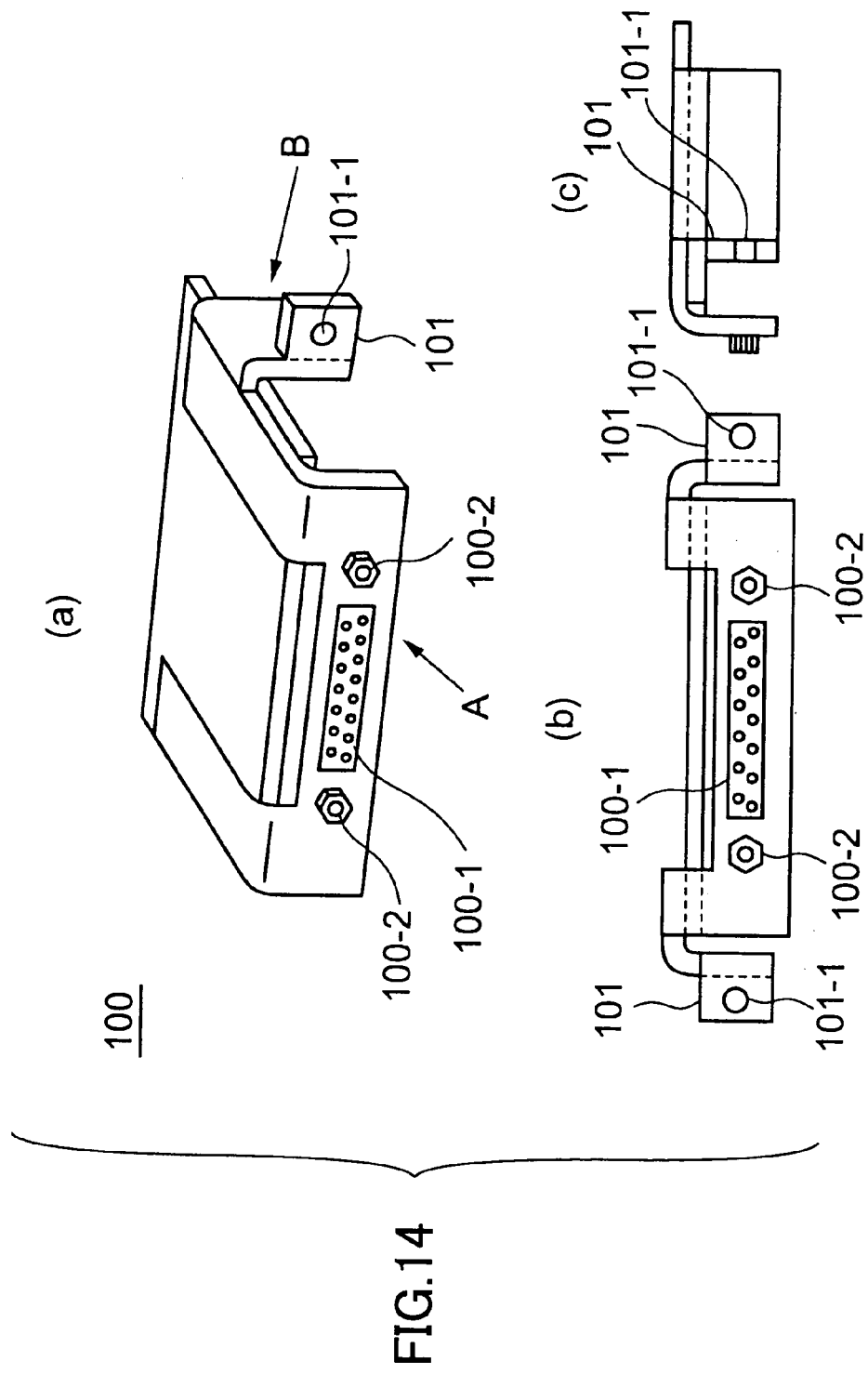
FIG. 14 is a schematic view showing a structure of a first connector part 100.

FIG. 14 is a schematic view showing a structure of the first connector part 100. More specifically, FIG. 14-(a) is a perspective view of the first connector part 100. FIG. 14-(b) is a view of the first connector part 100 shown in FIG. 14-(a) seen in the "A" direction in FIG. 14-(a). FIG. 14-(c) is a view of the first connector part 100 shown in FIG. 14-(a) seen in the "B" direction in FIG. 14-(a).

Referring to FIG. 14, screw receiving parts 101 are provided at both ends of the first connector part 100 for screws 200 for fixing. A hole forming part 101-1 is provided at a substantially center part of the screw receiving part 101. The screw 200 for fixing is inserted into and screwed as to be fixed to the hole forming part 101-1 so that the first connector 100 is attached to the fixing plate 210.

Figure 15:
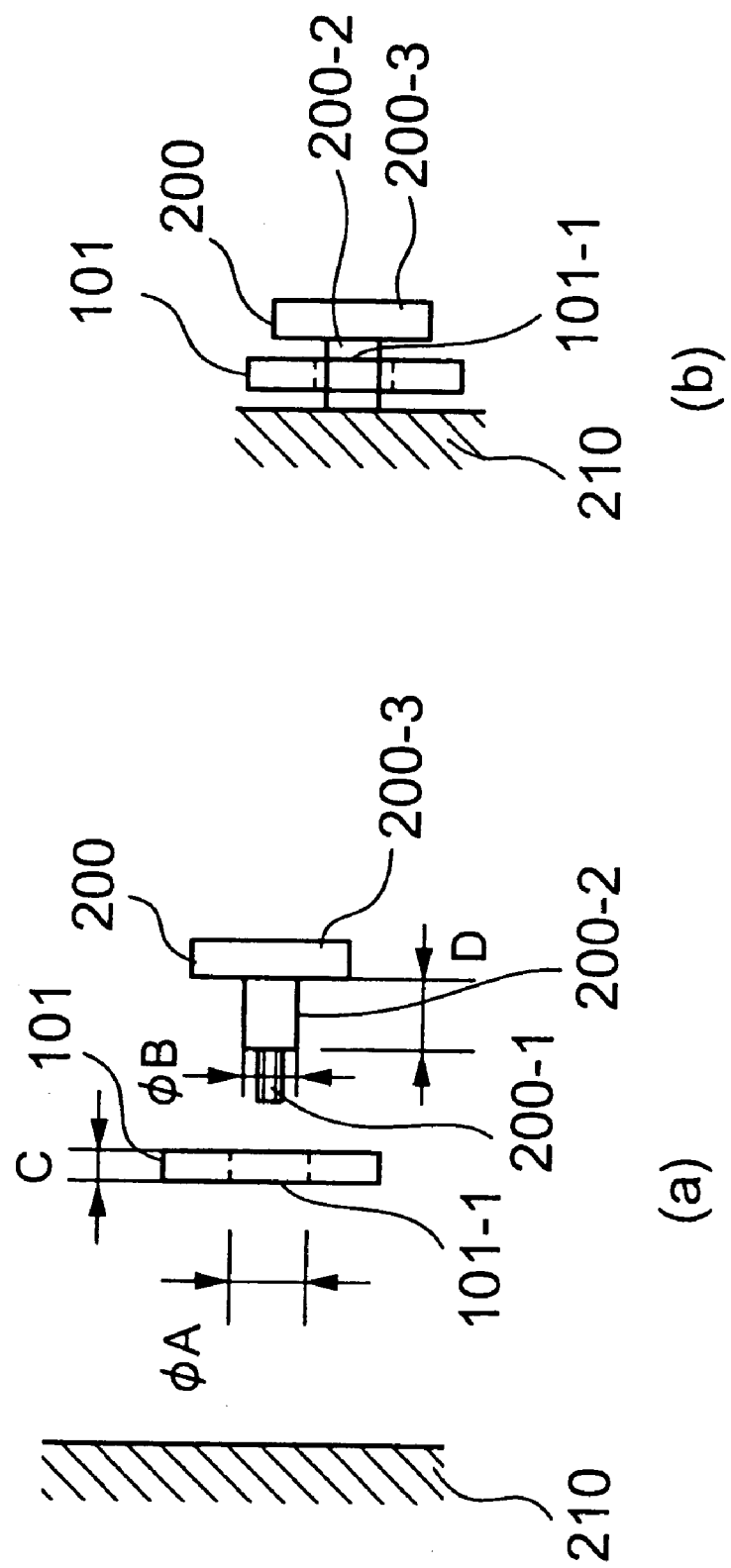
FIG. 15 is a schematic view showing a relation of a fixing plate 210, a screw 200 for fixing, and a screw receiving part 101 of the first connector 100.

FIG. 15 is a schematic view showing a relation of the fixing plate 210, the screw 200, and the screw receiving part 101 of the first connector part 100. More specifically, FIG. 15-(a) is a schematic view showing measurement relationships of the fixing plate 210, the screw 200, and the screw receiving part 101. FIG. 15-(b) is a schematic view of a state where the screw receiving part 101 is attached to the fixing plate 210 by the screw 200.

Referring to FIG. 15-(a), the screw 200 includes a first shaft part 200-1, a second shaft part 200-2, and a head part 200-3. A screw groove is formed at the first shaft part 200-1. A diameter "B" of the second shaft part 200-2 is larger than a diameter of the first shaft part 200-1 and smaller than a diameter "A" of the hole forming part 101-1 of the screw receiving part 101. Furthermore, a length "D" in a shaft direction of the second shaft part 200-2 is longer than a length "C" in a shaft direction of the hole forming part 101-1 of the screw receiving part 101.

Therefore, as shown in FIG. 15-(b), even if the first shaft part 200-1 of the screw 200 is received by the fixing plate 210, a floating structure wherein a gap is provided between the screw fixing part 101 of the first connector part 100 and the second shaft part 200-2, is formed. Since the first connector 100 has the above mentioned floating structure, the radio transmitting and receiving part 50-1 can be moved up and down and right and left in a floating manner.

Guide pins 300-2 provided at the first connector part 300 of the interface part 24 of the common part 20 shown in FIG. 3 are guided to the guide pin receiving hole 100-2. When the first connector engaging part 300-1 of the interface part 24 is engaged with the first connector engaging part 100-1 of the interface part 55, it is possible to fix a position of the first connector engaging part 300-1 and the first connector engaging part 100-1 freely.

Next, an engaging structure of the second connector 120 of the interface part 55 of the radio transmitting and receiving part 50-1 and a second connector part 320 of the interface part 24 of the common part 20 is explained.

Figure 16:
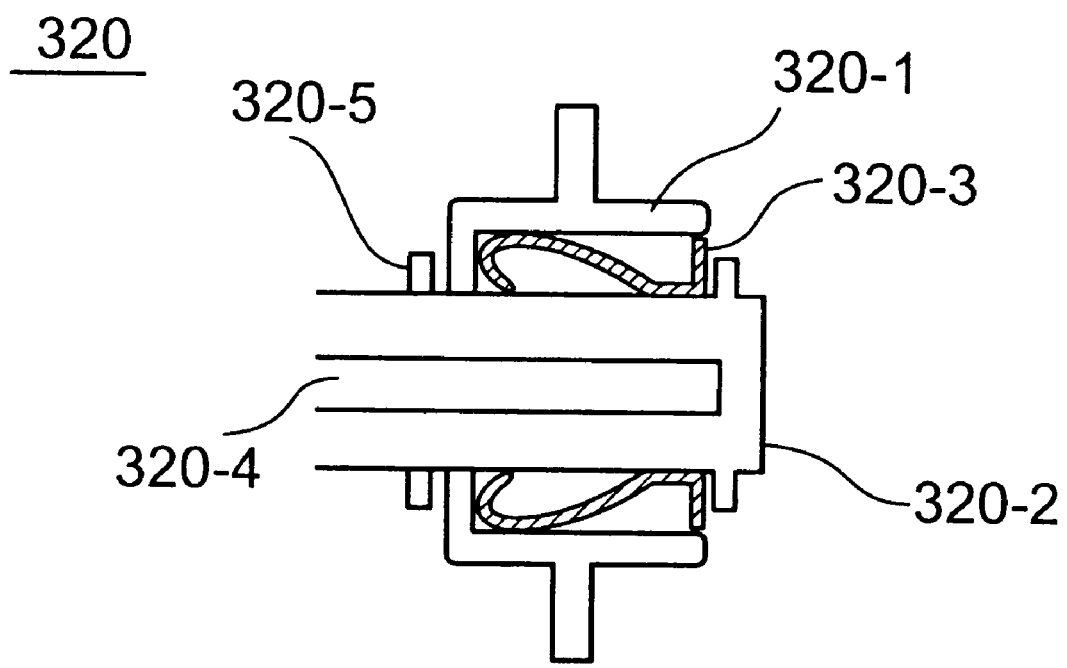
FIG. 16 is a schematic view showing a side cross-sectional elevation of a second connector part 320 of an interface part of the common part 20 shown in FIG. 3-(b)

FIG. 16 is a schematic view showing a side cross-sectional elevation of the second connector part 320 of the interface part 24 of the common part shown in FIG. 3-(b).

Referring to FIG. 16, the second connector part 320 includes an external part shell 320-1 and an internal part shell 320-2. The external part shell 320-1 receives the internal part shell 320-2 and an elastic member 320-3 such as a spring provided at the circumference of the internal part shell 320-2. Conductive member 320-4 is provided at a substantially center part inside of the internal part shell 320-2. A fixing ring 320-5 is provided at a circumference of the internal part shell 320-2 and in the rear of the external part shell 320-1 so as to support the internal part shell 320-2.

Furthermore, as shown in FIG. 13, the second connector part 120 of the interface part 55 of the radio transmitting and receiving part 50-1, which is situated at a left side in FIG. 13, is connected to the microwave transmitting part 70 via a pipe cable 400. In addition, the second connector part 120 of the interface part 55 of the radio transmitting and receiving part 50-1, which is situated at the right side in FIG. 13, is connected to the microwave receiving part 72 via a pipe cable 410.

The second connector part 120 extends in a vertical direction on the paper of FIG. 5-(a) so as to be inserted into the internal part shell 320-2 of the second connector part 320 of the interface part 24 of the common part 20.

As described above, the elastic member 320-3 is provided at a circumference of the internal shell 320-2. Hence, when the second connector part 120 of the radio transmitting and receiving part 50-1 is inserted into the internal part shell 320-2 of the second connector 320 of the common part 20, the second connector part 120 of the radio transmitting and receiving part 50-1 can be moved up and down and right and left in a floating manner with the internal shell 320-2 of the second connector part 320 of the common part 20. Namely, a floating structure is formed.

Therefore, under the above mentioned floating structure, even if a measurement error exists, the second connector part 120 of the radio transmitting and receiving part 50-1 can be engaged with the second connector 320 of the common part 20 freely.

A signal is transmitted and received between the second connector part 120 of the interface part 55 of the radio transmitting and receiving part 50-1 and the second connector 320 of the interface part 24 of the common part 20.

Next, an engaging structure of a third connector 140 of the interface part 55 of the radio transmitting and receiving part 50-1 and a third connector part 340 of the interface part 24 for transmitting and receiving of the common part 20, is described.

Referring to FIG. 5-(a) and FIG. 13-(b), the third connector part 140 of the radio transmitting and receiving part 50-1 is extended in a vertical direction in the paper of FIG. 5-(a) and FIG. 13-(b) so as to be inserted into the third connector part 34 of the interface part 24 of the common part 20.

Furthermore, as shown in FIG. 3, installation parts 360 are provided right and left of the third connector part 340 of the interface part 24 of the common part 20, whereby the third connector part 340 is installed to the interface part 24.

Figure 17:
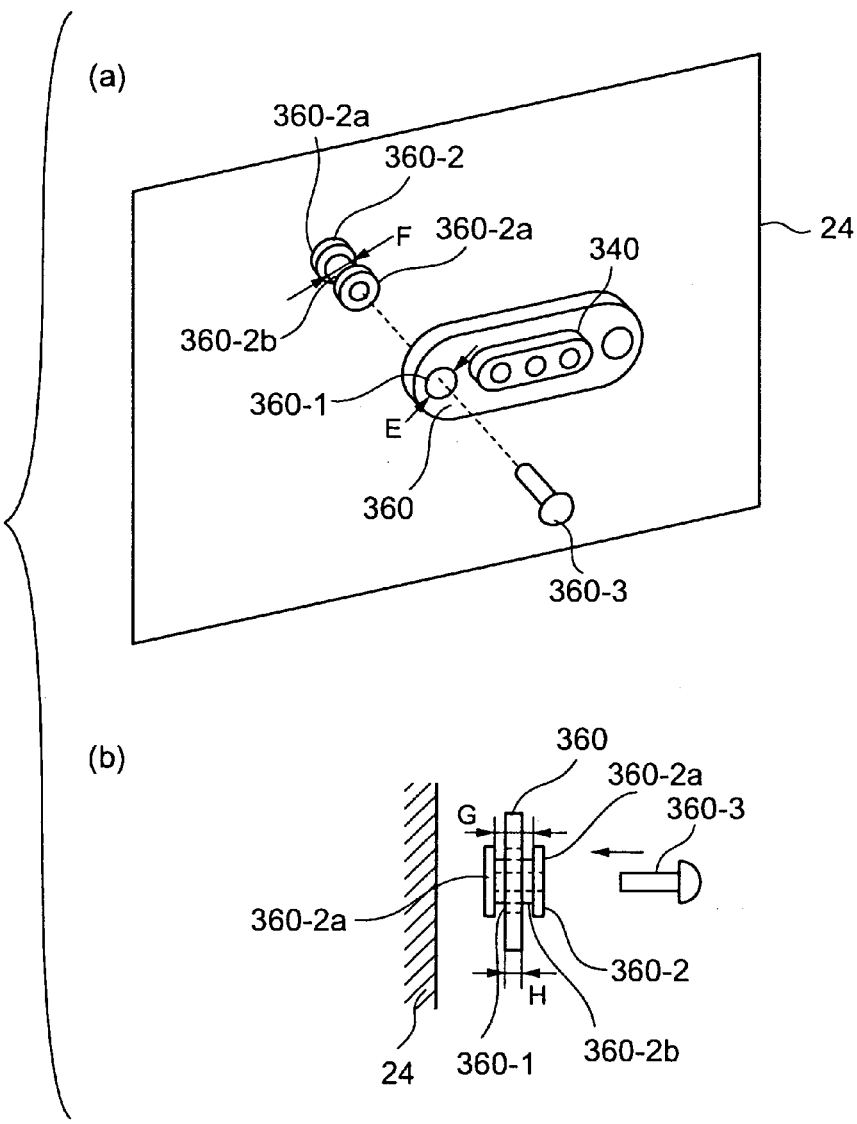
FIG. 17 is a view showing an installation of a third connector part 340 to the interface part 24 by using an installation part 360.

FIG. 17 is a view showing an installation of the third connector part 340 to the interface part 24 by using the installation part 360. More specifically, FIG. 17-(a) is a exploded perspective view of the third connector part 340, the interface part 24, and the installation part 360. FIG. 17-(b) is a view showing a state where the installation part 360 shown in FIG. 17-(a) is installed to the interface part 24 of the common part 20 by an installation screw 360-3.

Referring to FIG. 17, an installation hole forming part 360-1 whose a substantially center part is a hole is provided at the installation part 360. Furthermore, a bush member 360-2 whose a substantially center part is hole is inserted into the installation hole forming part 360-1. Head parts 360-2a are provided at both ends of the bush member 360-2. A shaft member 360-2b is provided between the both ends.

A diameter "F" of the shaft member 360-2b of the bush member 360-2 is larger than a diameter of the head part 360-2a and smaller than a diameter "E" of the installation hole forming part 360-1. Furthermore, a length "G" of the shaft part 360-2b in a shaft direction is longer than a length "H" of the installation hole forming part 360-1.

Therefore, as shown in FIG. 17-(b), even if the installation screw 360-3 is installed to the interface part 24 for transmitting and receiving by the installation part 360, a floating structure wherein a gap is provided between the installation hole forming part 360-1 of the installation part 360 and the bush member 360-2, is formed. Because of this floating structure, the bush member 360-2 can be moved in the gap in a floating manner.

That is, the third connector part 340 of the interface part 24 of the common part 20 has a play so as to be moved up and down and right and left in a floating manner.

Therefore, under the above mentioned floating structure, when the third connector part 140 of the interface part 55 of the radio transmitting and receiving part 50-1 is installed to the third connector part 340 of the interface part 24 of the common part 20, even if there is a measurement error both of them can be engaged freely.

The third connector part 140 of the interface part 55 of the radio transmitting and receiving part 50-1 is connected to the first modulation and demodulation part 61 via a cable not shown.

Under the above mentioned structure, a signal is transmitted and received between the third connector part 140 of the interface part 55 of the radio transmitting and receiving part 50-1 and the third connector part 340 of the interface part 24 of the common part 20.

Thus, the interface part 55 of the radio transmitting and receiving part 50-1 and the interface part 24 of the common part 20 have the above mentioned floating structures. Hence, even if either or both of them has a measurement error, it is possible to reliably engage both of them so that the radio transmitting and receiving part 50-1 can be electrically connected to the common part 20.

Next, installation of the radio transmitting and receiving part 50-1 to the common part 20 is described.

Figure 18:
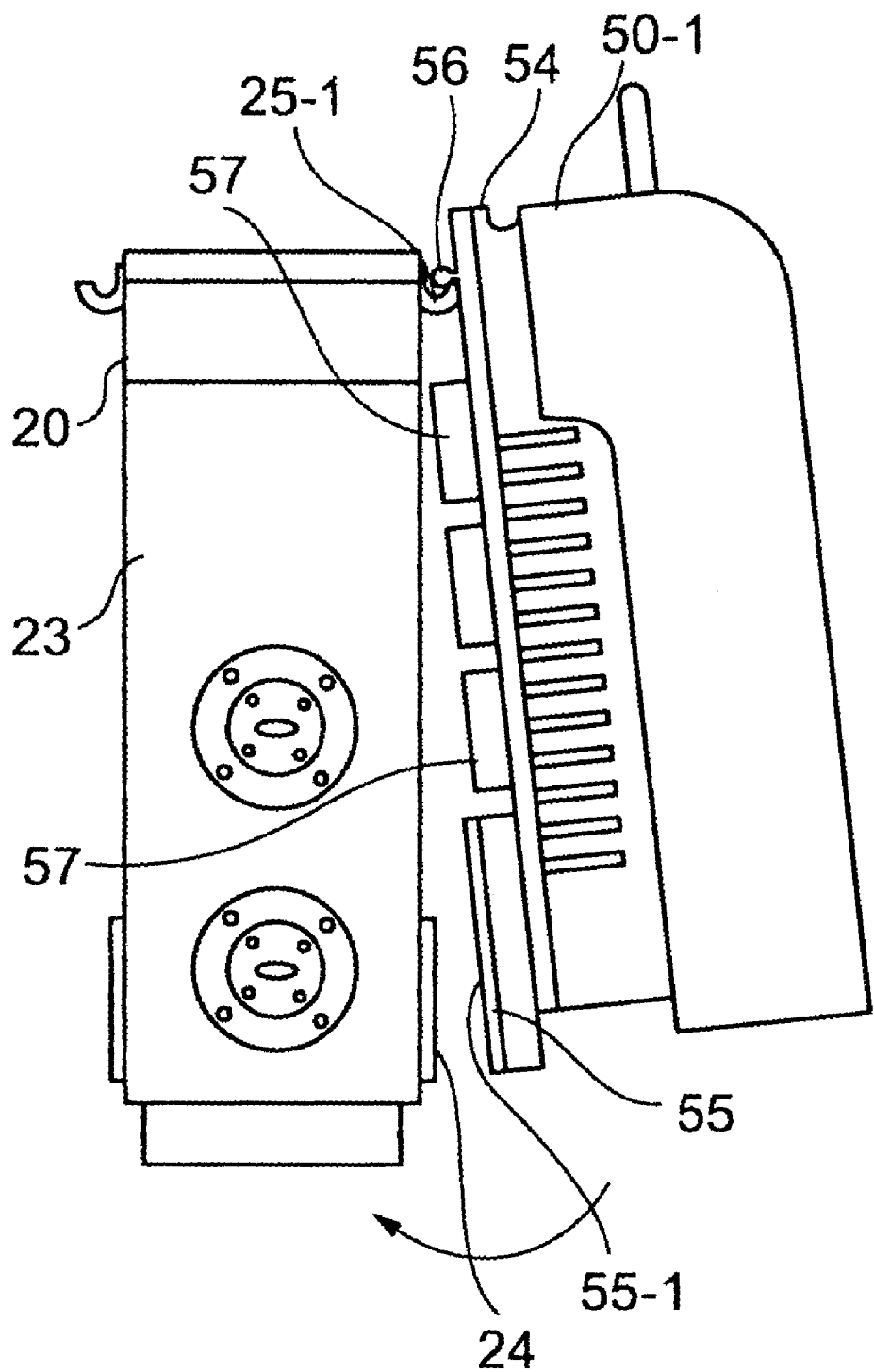
FIG. 18 is a view for explaining a structure of an installation of the common part 20 to the radio transmitting and receiving part 50-1.

FIG. 18 is a view for explaining the installation to the common part 20 of the radio transmitting and receiving part 50-1. FIG. 18 shows a state where the radio transmitting and receiving part 50-1 is installed to the common part 20, seen in the Y1 direction in FIG. 2.

Referring to FIG. 18, the hanging shaft member 56, provided at a lower part of the back surface member 54 of the radio transmitting and receiving part 50-1, is hung on the bearing part 25, provided at an upper part of the right side surface part 23 of the common part 20. Then, he radio transmitting and receiving part 50-1 is rotated in the direction shown by an arrow in FIG. 18.

Based on that the hanging shaft member 56 being received by the bearing part 25, the upper part of the radio transmitting and receiving part 50-1 is fixed to the upper part of the common part 20. Based on that the interface part 24 being engaged with the interface part 55, the lower part of the radio transmitting and receiving part 50-1 is fixed to the lower part of the common part 20.

Thus, the radio transmitting and receiving parts 50-1 through 50-4 are installed and fixed to the common part 20.

Meanwhile, as described above, the height (the length in X2-X1 directions in FIG. 2) of the interface part 55 is greater than the height (the length in X2-X1 directions in FIG. 2) of the radiation heat fins 57. Therefore, when the radio transmitting and receiving part 50-1 is installed to the common part 20, a gap between the radiation heat fins 57 and the right side surface part 23 of the common part 20 is formed. Therefore, air can enter into the gap so that transfer of heat from the radio transmitting and receiving part 50-1 to the radiation heat fins 57 can be promoted.

Furthermore, as described above, the groove forming part 55-2 is formed along the internal circumference of the surface 55-1, at the part of the surface 55-1 higher than the radiation heat fins 57 of the interface part 55. The waterproof packing 58 is provided in the groove forming part 55-2 as a waterproof member. See FIG. 5.

Therefore, as described above, when the radio transmitting and receiving part 50-1 is installed to the common part 20 and the interface part 55 is engaged with the interface part 24 for transmitting and receiving part, the waterproof packing 58 adheres to the inter face part 55 of the radio transmitting and receiving part 50-1. Hence, it is possible to prevent precipitation from invading the interior of the common part 20 and the radio transmitting and receiving part 50-1. Thus, even if the radio transmitting and receiving parts 50-1 through 50-4 and the common part 20 are provided in an outdoor environment, it is possible to reliably achieve waterproofing of the electronic equipment provided inside thereof.

Under the above mentioned installation structure, it is possible to install the radio transmitting and receiving part 50-1 to an external part of the common part 20 easily. Since the radio transmitting and receiving parts 50-1 through 50-4 are provided at the external part of the common part 20, depending on the way of use, it is possible to easily perform installations other radio transmitting and receiving parts 50-2 through 50-4 under the condition that each of the radio transmitting and receiving parts 50-1 through 50-4 is a single exchanging unit, and removal and exchange of the respective one of the radio transmitting and receiving parts 50-1 through 50-4 from the common part 20 is for maintenance of the respective one of the radio transmitting and receiving parts 50-1 through 50-4.

For example, the structure of the branching part 33 and the number of installations of the radio transmitting and receiving parts 50-1 through 50-4 to the common part 20 may be changed properly. With regard to a single polarization wave (for example only "V" polarization wave) or both polarization waves ("V/H" polarization wave), one of the radio transmitting and receiving parts 50-1 through 50-4 may be used for preparation or standby and another of the radio transmitting and receiving parts 50-1 through 50-4 may be used for actual operations. Thus, the radio transmitting and receiving parts 50-1 through 50-4 can be used variously. Use is not always to provide a radio transmitting and receiving part for preparation or standby, it may be to form a structure where the maximum four of the radio transmitting and receiving parts 50-1 through 50-4 are used for actual operations.

Furthermore, under the above mentioned structure, it is possible to achieve transmitting and receiving electricity and electrical signals between the interface part 24 of the common part 20 and the interface part 55 of the radio transmitting and receiving part 50-1, effective dissipation of heat from the radio transmitting and receiving part 50-1, and waterproofing of the common part 20 and the radio transmitting and receiving part 50-1.

The present invention is not limited to these embodiments, but variations and modifications may be made without departing from the scope of the present invention.

This patent application is based on Japanese priority patent application No. 2002-282516 filed on Sep. 27, 2002, the entire contents of which are hereby incorporated by reference.

What is claimed is:

1. Outdoor radio equipment, comprising:
a radio transmitting and receiving part for performing a modulation and demodulation process; and
a common part for controlling an action of the radio transmitting and receiving part, wherein
the radio transmitting and receiving part is provided at the common part so as to be exposed to open air, and
at least a part of an external side surface of the radio transmitting and receiving part is exposed to open air.

2. The outdoor radio equipment as claimed in claim 1, wherein a plurality of the radio transmitting and receiving part is provided at the common part.

3. The outdoor radio equipment as claimed in claim 1, wherein the common part includes a first interface part for the transmitting and receiving part including a first connector,
the radio transmitting and receiving part includes a second interface part for the common part including a second connector,
the second interface part is provided at a side, where the common part is provided, of the radio transmitting and receiving part, and
the radio transmitting and receiving part is electrically connected to the common part by engaging the second connector of the second interface part with the first connector of the first interface part.

4. The outdoor radio equipment as claimed in claim 3, wherein at least one of the second connector of the second interface part and the first connector of the first interface part is floatably supported in an installation surface.

5. The outdoor radio equipment as claimed in claim 3, wherein a waterproof member is provided at a surface where the second interface part of the radio transmitting and receiving part comes in contact with the first interface part of the common part.

6. The outdoor radio equipment as claimed in claim 3, wherein the radio transmitting and receiving part includes a shaft member,
the shaft member is provided at an upper part of the side where the radio transmitting and receiving part is installed to the common part,
the common part includes a bearing part,
the bearing part is provided at an upper pan of the side where the common part is installed to the radio transmitting and receiving part, and
the shaft member is hung in the bearing part and rotated, so that the radio transmitting and receiving part is connected to the common part.

7. The outdoor radio equipment as claimed in claim 1, wherein
the radio transmitting and receiving part includes a housing,
electrical equipment is provided inside of the housing of the radio transmitting and receiving part,
a radiation heat member is provided at a side to be installed to the common part, of the housing of the radio transmitting and receiving part,
the electrical equipment comes in contact with the housing or the radiation beat member directly or indirectly, and
the heat from the electrical equipment is transferred to open air via the housing or the radiation heat member.

8. The outdoor radio equipment as claimed in claim 7, wherein a gap is formed between the radiation heat member provided at the housing part and the common part when the radio transmitting and receiving part is installed to the common part.

9. The outdoor radio equipment as claimed in claim 7, wherein the electronic equipment provided at the housing of the radio transmitting and receiving part includes:
an electric power source part for supplying an electric power to electronic components provided at the radio transmitting and receiving part,
a microwave transmitting part for converting information to a signal to be transmitted, a microwave receiving pan for converting a received signal to information; and
a modulation and demodulation part for modulating and demodulating a signal wave.

10. The outdoor radio equipment as claimed in claim 1, wherein the common part includes:
an electric power source part for converting a first electric power source to a second electric power source and supplying electric power to electronic components provided at the common part,
a control part for monitoring the radio transmitting and receiving part installed to the common part, and controlling a branching part for selecting a signal and distributing the signal to the radio transmitting and receiving part, and
a switching part for switching one of a plurality of the radio transmitting and receiving parts installed to the common part.

11. A radio unit, the radio unit being installed to a common part which has a function of transmitting and receiving a radio signal via an antenna and a substantially box-type configuration,
the radio unit having a modulation and demodulation part for performing a demodulation process of an input radio signal of the common part, outputting the demodulated signal to the common part, performing a modulation process by using another radio signal input from the common part, and outputting a modulated wave to the common part,
the radio unit, comprising:
a second connector part which is engaged with a first connector part of a side surface of the common part when the modulation and demodulation part is installed to the common part and which transmits and receives a signal including the radio signal,
an installation part for installing the modulation and demodulation part to the side surface of the common part, and
a radiation heat structure for preventing an temperature from increasing in the modulation and demodulation part.

* * * * *